US012752714B2

(12) United States Patent
Schroeder

(10) Patent No.: US 12,752,714 B2
(45) Date of Patent: Oct. 6, 2026

(54) RAISABLE BIKE RACK AND ASSOCIATED SYSTEMS AND METHODS

(71) Applicant: Peter D. Schroeder, Dubuque, IA (US)

(72) Inventor: Peter D. Schroeder, Dubuque, IA (US)

( * ) Notice: Subject to any disclaimer, the term of this patent is extended or adjusted under 35 U.S.C. 154(b) by 0 days.

(21) Appl. No.: 17/855,967

(22) Filed: Jul. 1, 2022

(65) Prior Publication Data

US 2023/0001860 A1 Jan. 5, 2023

Related U.S. Application Data

(60) Provisional application No. 63/251,931, filed on Oct. 4, 2021, provisional application No. 63/217,720, filed on Jul. 1, 2021.

(51) Int. Cl.
*B60R 9/10* (2006.01)

(52) U.S. Cl.
CPC ..................................... *B60R 9/10* (2013.01)

(58) Field of Classification Search
CPC ........................................................ B60R 9/10
See application file for complete search history.

(56) References Cited

U.S. PATENT DOCUMENTS 4,630,990 A * 12/1986 Whiting .................. B60R 9/042 224/310
6,663,133 B1 * 12/2003 Rosenlund .............. B60D 1/06 280/490.1
6,929,163 B1 8/2005 Pedrini
7,055,725 B1 6/2006 Kolda
7,118,016 B1 10/2006 Kolda
7,213,731 B1 5/2007 Kolda
7,240,816 B2 * 7/2007 Tsai .......................... B60R 9/10 211/195
7,341,417 B1 3/2008 Lohr
7,946,432 B1 5/2011 Swanson
8,783,536 B1 * 7/2014 Julian ....................... B60R 9/06 224/495
10,118,530 B2 * 11/2018 Laupp ....................... B66F 9/12
10,214,152 B1 2/2019 Bass
10,864,839 B1 * 12/2020 Chambers ............ B62D 33/033
10,974,118 B2 4/2021 Bass
11,046,379 B2 * 6/2021 Tsai ......................... B62H 3/00
11,299,225 B1 4/2022 DeBaker
11,673,511 B2 * 6/2023 Shaw ........................ B60R 9/06 414/462
2011/0049207 A1 * 3/2011 Hufgard .................. B60P 3/122 224/510
2013/0062383 A1 * 3/2013 Jeli ........................... B60R 9/10 224/549
2017/0349110 A1 12/2017 Bass

FOREIGN PATENT DOCUMENTS

EP 2848473 A1 * 3/2015 ............... B60R 9/06
KR 100940797 B1 * 2/2010
WO 2023092035 A1 5/2023

* cited by examiner

*Primary Examiner* — Scott T Mcnurlen
(74) *Attorney, Agent, or Firm* — DENTONS DAVIS BROWN PC; Matthew Warner-Blankenship

(57) ABSTRACT

The disclosed apparatus, systems and methods relate to a bike rack. For example, a raisable bike rack that includes a support bracket, that may be attached to a vehicle, and a linear slide engaged with the support bracket, where the linear slide may raise and lower the support bracket relative to the vehicle for bike loading.

19 Claims, 48 Drawing Sheets

RAISABLE BIKE RACK AND ASSOCIATED SYSTEMS AND METHODS

CROSS-REFERENCE TO RELATED APPLICATION(S)

This application claims the benefit under 35 U.S.C. § 119(e) to U.S. Provisional Application 63/217,720, filed Jul. 1, 2021, and entitled RAISABLE BIKE RACK AND ASSOCIATED SYSTEMS AND METHODS, and U.S. Provisional Application 63/251,931, filed Oct. 4, 2021, and entitled RAISABLE BIKE RACK AND ASSOCIATED SYSTEMS AND METHODS, each of which is hereby incorporated herein by reference in its entirety for all purposes.

TECHNICAL FIELD

The disclosure relates generally to bike racks and to the devices, methods, and systems for improved loading of bikes onto and off the rack and transportation thereof.

BACKGROUND

In some cases, a bike may be transported using a vehicle, for example on an external bike rack. Various bike racks attach to the hitch of a vehicle. These known bike racks are fixed to the vehicle and hold a bike around or above the rear bumper of the vehicle such that the bike does not impact the ground during driving. Thus, a bike must be lifted, sometimes a few feet, to be loaded onto or unloaded off a traditional bike rack.

In some cases, it may be difficult to lift and position a bike onto the bike rack. For example, the bike may be heavy, the user may be unable to lift the bike, or both. Thus, there is a need in the art for improved, easier, safer, more accessible bike racks.

BRIEF SUMMARY

Described herein are various embodiments relating to devices, systems, and methods relating to a bike rack for easier, safer, and more accessible loading and unloading of a bike on a bike rack. The various implementations, also maintain ample ground clearance during the transportation of a bike on the bike rack.

One Example includes a raisable bike rack, including a support bracket configured to be attached to a vehicle, and a linear slide engaged with the support bracket, where the linear slide is configured to raise and lower the support bracket relative to the vehicle for bike loading.

Implementations according to this Example may include one or more of the following features. The raisable bike rack further including a control hub configured to control the linear slide. The raisable bike rack where the control hub further includes a power source coupled to the linear slide and an actuator switch in communication with the power source. The raisable bike rack where the power source includes a battery. The raisable bike rack further including a center beam. The raisable bike rack where the center beam is attached to the support bracket and the linear slide on a first portion such that the support bracket is capable of a lowered loading state and a raised transport state. The raisable bike rack where the center beam is attached to a vehicle connection mechanism on a second portion such that the first portion of the center beam is configured to move relative to the second portion of the center beam.

Another Example includes a raisable bike rack, including a support bracket configured to support a bike, a vehicle connection mechanism, and a linear slide engaged with the support bracket and the vehicle connection mechanism, where the linear slide is configured to raise and lower the support bracket relative to the vehicle connection mechanism for bike loading.

Implementations according to this Example may include one or more of the following features. The raisable bike rack further including a center beam, where the center beam is attached to the support bracket and the linear slide on a first portion such that the support bracket is capable of a lowered loading state and a raised transport state. The raisable bike rack where the support bracket is in contact with a ground surface when in the lowered loading state. The raisable bike rack where the support bracket further includes a support base, a wheel support, a wheel strap, a support arm, and a side arm. The raisable bike rack where the support base is removably attached to a side arm and a post. The raisable bike rack further including a vertical support coupled to the post, where the vertical support is configured to be raised and lowered with the support bracket relative to the vehicle connection mechanism for bike loading. The raisable bike rack where the vehicle connection mechanism further includes a hitch beam configured to engage a receiving hitch.

Another Example includes a raisable bike rack, including a support bracket configured to support an electric bike, a vehicle connection mechanism, a linear slide engaged with the support bracket and the vehicle connection mechanism where the linear slide is configured to raise and lower the support bracket relative to the vehicle connection mechanism for bike loading, and a control hub disposed on the linear slide, where the control hub is configured to control the linear slide.

Implementations according to this Example may include one or more of the following features. The raisable bike rack where the control hub further includes a power source coupled to the linear slide, and an actuator switch in communication with the power source. The raisable bike rack where the actuator switch includes an up position, a down position, and an off position. The raisable bike rack where the linear slide is configured to compress and move the support bracket up to a transport state when the actuator switch is in the up position. The raisable bike rack where the linear slide is configured to extend and move the support bracket down to a loading state when the actuator switch is in the down position. The raisable bike rack where the linear slide is configured to lock the support bracket in place when the actuator switch is in the off position.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

DETAILED DESCRIPTION

Discussed herein are various devices, systems, and methods relating to an improved mountable rising bike rack. For brevity, and for ease of explanation, these embodiments may be described in relation to a "bike rack," though that is not intended to limit the scope of the disclosure in any way. For example, certain aspects can be used in other applications, such as for wheelchairs, skis, luggage, or other heavy equipment, as would be readily understood in the art.

According to certain embodiments, the disclosed bike rack and associated systems and methods have a movable support bracket that may be lowered, such as to the ground or nearer the ground, to load and secure a bike, and then may be raised to transport the bike.

In various implementations, the bike rack may be mounted on or affixed to a vehicle, such as for transport. In various additional implementations, the bike rack may be mounted to another surface, such as a wall for raised storage of various items.

In use, according to various implementations, a user may lower the bike rack's support bracket while the bike rack is mounted to the vehicle or other structure. After the support bracket is lowered, the user may easily roll the bike onto or off the rack when the support bracket is on the ground, or the user may slightly lift the bike onto or off the bike rack when the support bracket is slightly off the ground. This loading and unloading design allows users to load and unload heavy bikes or other items more easily. For example, electric bikes are typically substantially more heavy than traditional bikes due to the weight of their battery and as such the need for improved transportation and storage methods for such equipment.

After the bike is loaded onto the rack, the support brackets may be raised into a transport position such that the bike and rack is high enough off the ground to avoid impact with the road while the vehicle is moving. To unload the bike, the support brackets holding the bike may be lowered to the ground or slightly off the ground such that the bike can be easily rolled or slightly lifted off the bike rack. Alternatively, in certain embodiments, a support bracket may engage with the top of a bike, as would be understood by a skilled artisan and discussed further below.

Figure 1A:
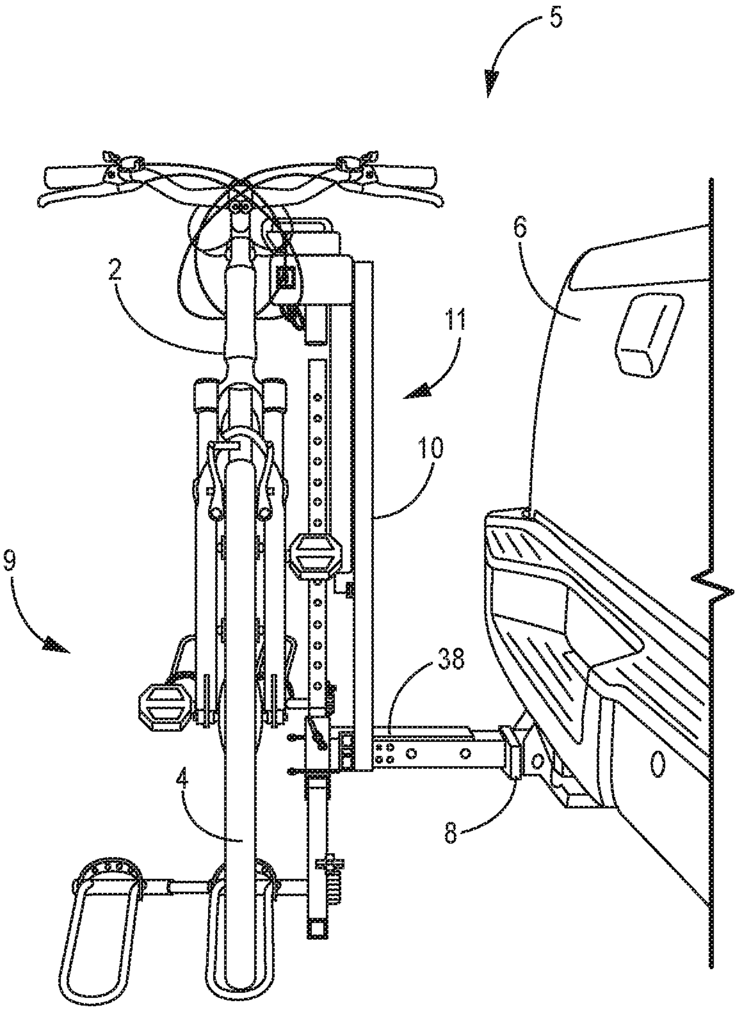
FIG. 1A shows the device in use in a raised, transport position, according to one implementation.
Figure 1B:
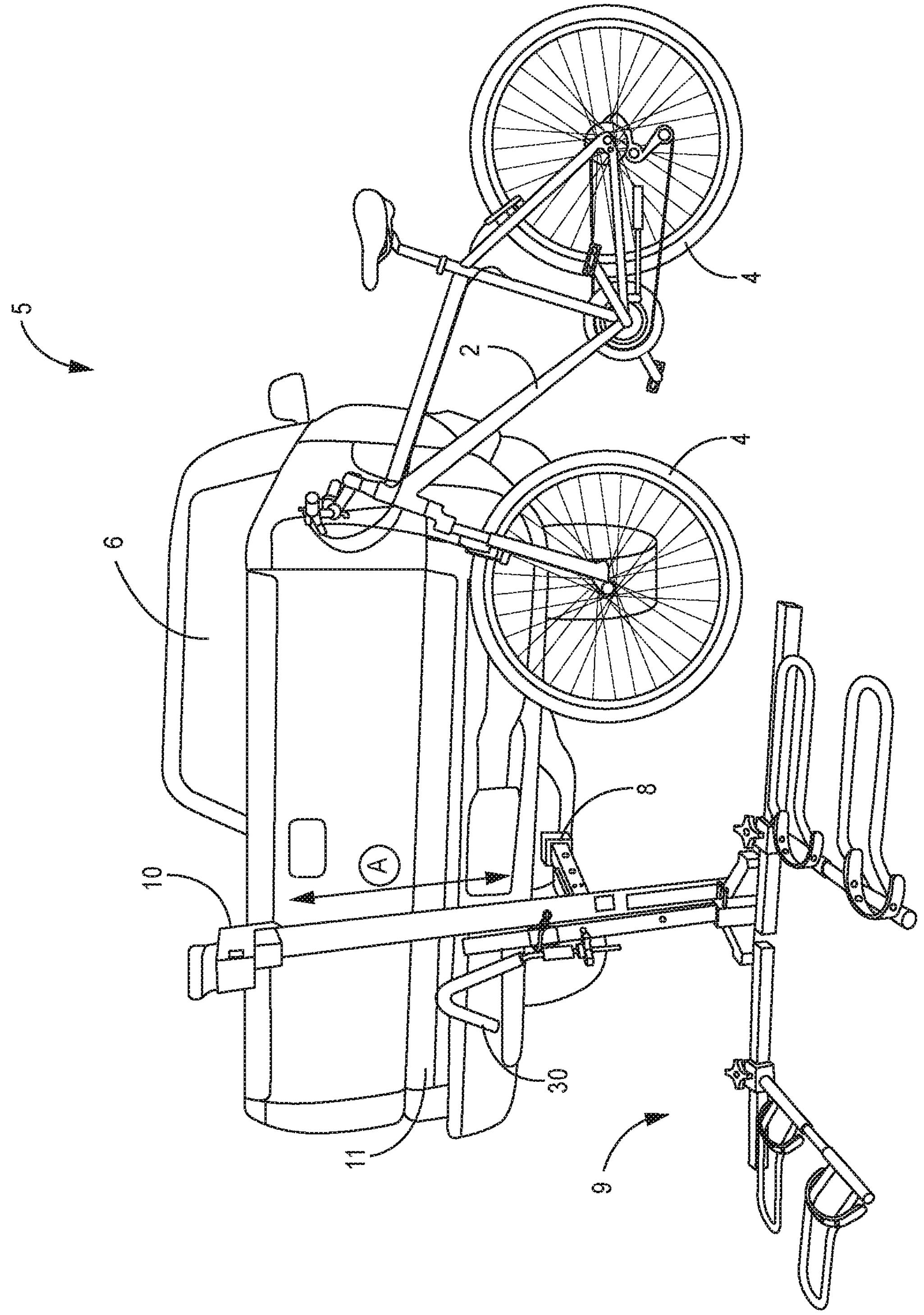
FIG. 1B shows the device in use in a lowered, loading position, according to one implementation.

Turning to the drawings in greater detail, FIGS. 1A-1B show one implementation of the bike rack 10 in use with a bike 2 that can be secured to the bike rack 10 for transportation and use, as would be appreciated. For example, the bike 2 may be secured to the bike rack 10 via the wheel(s) 4 of the bike 2. The bike rack 10 may in turn be attached to a vehicle 6. The bike rack 10 may optionally be attached to a hitch 8 of the vehicle 6 via a hitch beam 38, as would be understood, or via any understood attachment mechanism readily appreciated in the art. The bike rack 10 is configured to extend and retract vertically (as shown by reference arrow A) to alter the position of the bike rack 10 from the raised position shown in FIG. 1A to the lowered position shown in FIG. 1B, as would be understood. The bike rack 10 may include a bike holder 9 and an extension mechanism 11. The extension mechanism 11 optionally includes the center beam 36 and the linear slide 40, shown and discussed further below.

Continuing with the implementations of FIGS. 1A-1B in greater detail, according to the implementation of FIG. 1A, the bike rack 10 may be in the raised position such that the bike 2 and the bike rack 10 are high enough off the ground to avoid impact with the road while the vehicle 6 is moving. In various implementations, in this raised position, the bottom of the bike holder 9 is substantially the same height from the ground as the hitch beam 38. Alternatively, the bike holder 9 may be above or below the hitch 8 height, as would be understood. In this raised position, the bike 2 is situated on the bike rack 10 such that the wheels 4 sit on/within the bike holder 9. As described further herein, and as would be understood, an optional vertical support 30 may be provided for the bike 2.

As is also shown in the implementation of FIG. 1B, the bike rack 10 may be in a lowered position such that the bike holder 9 is close to or touching the ground for easy movement of a bike 2 or another item onto the bike holder 9. The bike rack 10 shown in FIG. 1B is in an extended/lowered state (movement shown by reference arrow A), to be in a loading/unloading position. In this lowered position, the bottom of the bike holder 9 is substantially closer to the ground than to the hitch beam 38. After the bike holder 9 is lowered, the user may roll the bike 2 onto or off the bike rack 10 when the bike holder 9 is on the ground. Alternatively, the user may slightly lift the bike 2 onto or off the bike rack 10, such as if the bike holder 9 is slightly off the ground, as would be understood by a skilled artisan.

In certain alternative implementations, the bike holder 9 may be rotated 180 degrees such that the bike holder 10 lowers onto the top of the bike 2 and is adapted to engage with the top of the bike wheels or other bike features (e.g., a handlebar, a cross bar, or a seat), as would be readily apparent to those of skill in the art. As a further example, in certain implementations the bike holder 9 is adapted to pass through the wheels and/or frame of the bike to lift the bike, as would also be readily appreciated. It is also understood that other known support structures, e.g., bike holders, may be used on the movable support.

Turning now to FIGS. 2A-6, in various implementations, the bike holder 9 is attached to the extension mechanism 11, specifically, to a center beam 36 via a brace 34. The bike holder 9 is constructed and arranged to move relative to the hitch beam 38 when the extension mechanism 11 is actuated. For example, the bike holder 9 is configured to be lowered (as shown by reference arrow A) relative to the hitch beam 38 to alter the position of the bike rack 10 from the raised position shown in FIG. 1A to the lowered position shown in FIG. 1B.

Figure 2A:
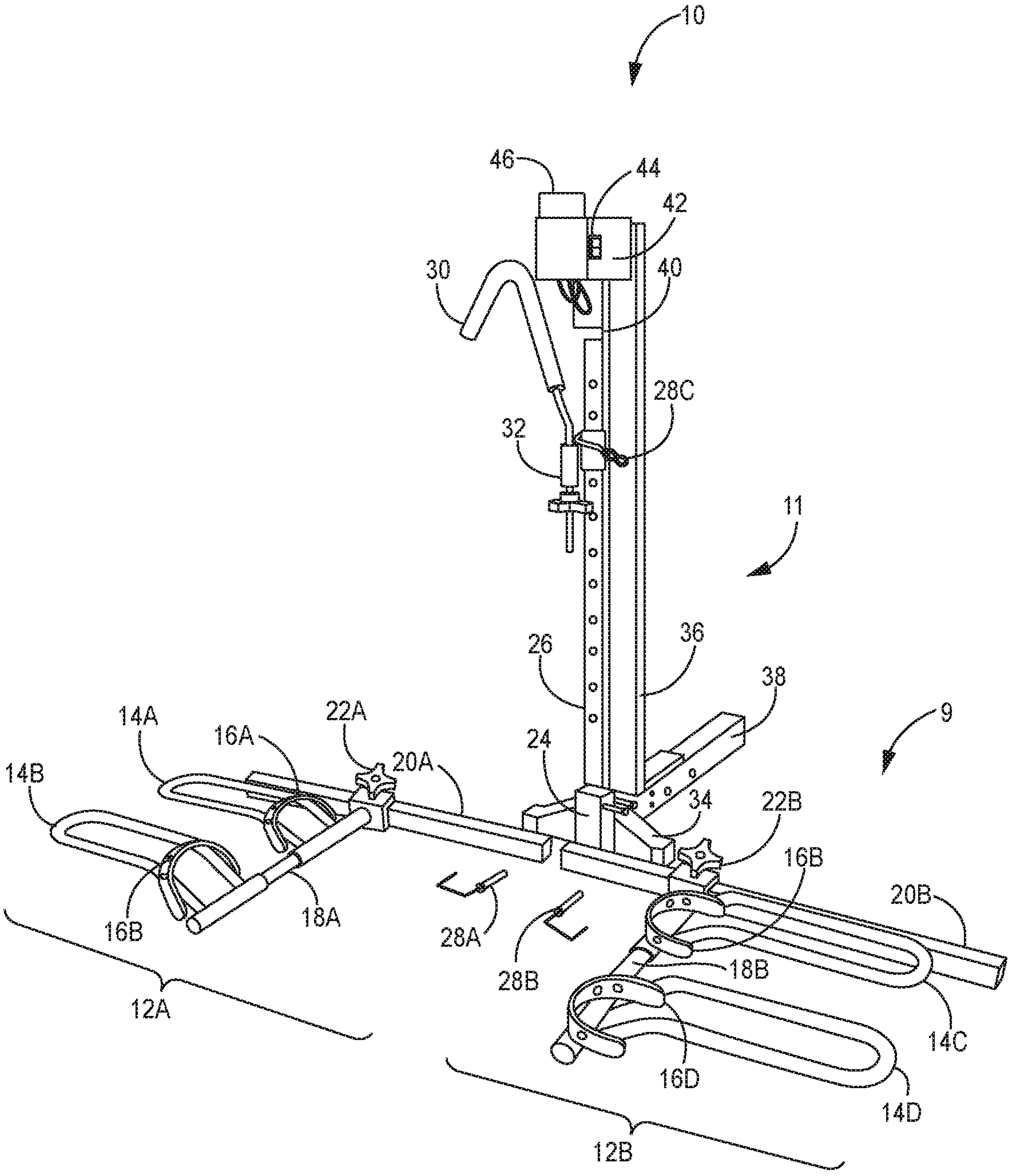
FIG. 2A is a perspective view of the bike rack, according to one implementation.
Figure 2B:
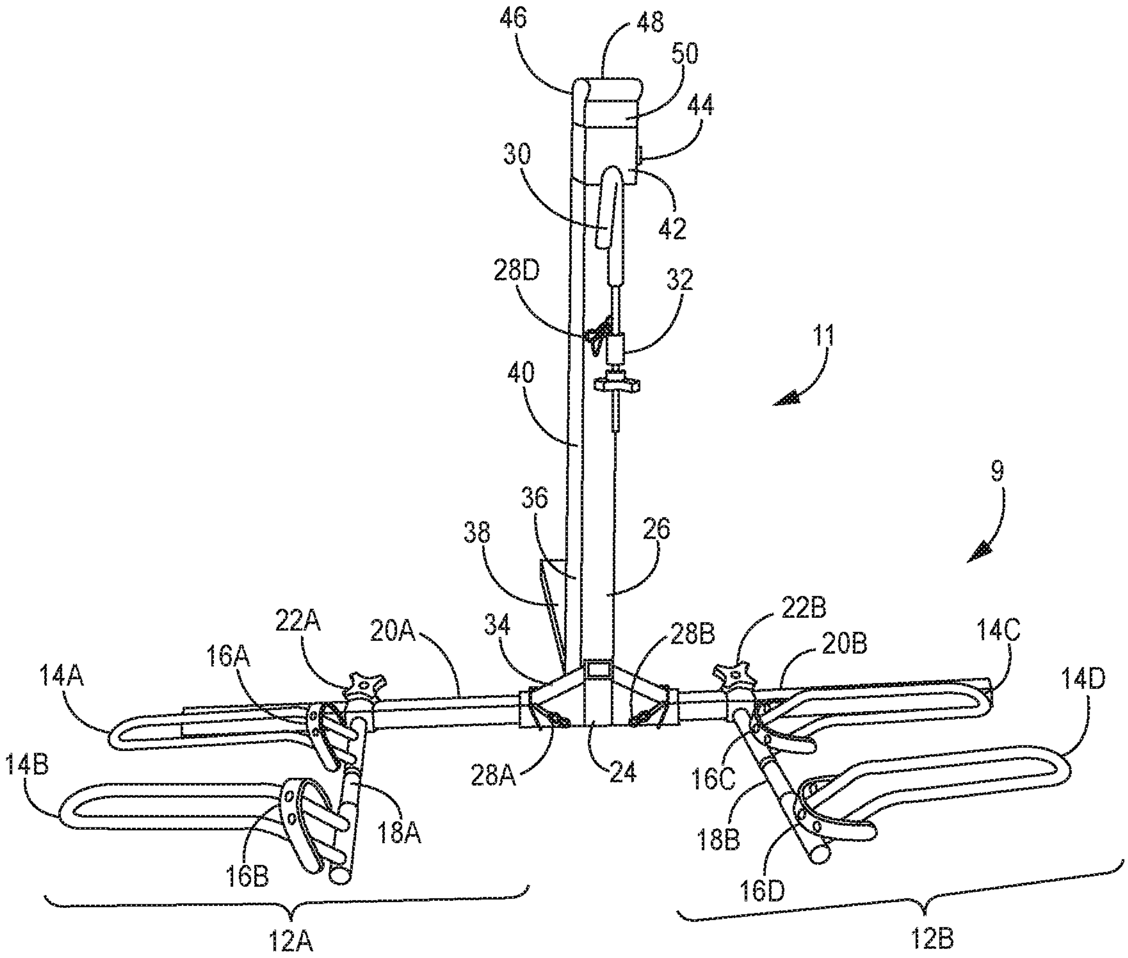
FIG. 2B is a front view of the bike rack, according to one implementation.

As shown in the implementation of FIGS. 2A-2B, the bike holder 9 of the bike rack 10 includes the support brackets 12A, 12B capable of supporting a bike 2 that are disposed on a substantially horizontal support base 24 secured to a vertically disposed post 26. In these and other implementations, the support brackets 12A, 12B are constructed and arranged to support a bike 2 by holding the wheels 4 of a bike 2. It is understood that in alternate implementations, the support brackets 12A, 12B are constructed and arranged to support other cargo items, one non-limiting example being wheelchairs or mobility scooters. Further implementations would of course be readily apparent to those of skill in the art.

Continuing with the implementations of FIGS. 2A-2B, a pair of support brackets 12A and 12B may be placed opposite one another, such that a first support bracket 12A holds a first wheel 4 of a bike (e.g., the front wheel), and a second support bracket 12B holds a second wheel 4 of the bike (e.g., the back wheel). The support brackets 12A, 12B may be configured to support multiple bikes simultaneously. Each support bracket 12A, 12B may include wheel supports 14A, 14B, 14C, 14D, and each wheel support 14A, 14B, 14C, 14D may be configured with a wheel strap 16A, 16B, 16C, 16D to secure a wheel 4 in the respective wheel support 14A, 14B, 14C, 14D. The geometry and load requirements of various multiple bike configurations would be readily understood by those of skill in the art, such that racks 10 having several bike capacities are possible and contemplated herein.

As shown in FIGS. 2A-2B, a wheel strap 16A, 16B, 16C, 16D may surround a portion of a wheel 4 and tire such that the bottom of the wheel 4 is held up by the wheel support 14A, 14B, 14C, 14D and held down by the wheel strap 16A, 16B, 16C, 16D. The wheel supports 14A, 14B, 14C, 14D may be attached to the support arms 18A, 18B. A wheel support 14A, 14B, 14C, 14D may be shaped to further secure a wheel 4 from undesired movement. For example, a wheel support 14A, 14B, 14C, 14D may be at least partially angled up and away from the support arm 18A, 18B to increase the security of the wheel 4, as would be understood by a skilled artisan.

In various implementations, the support arm 18A, 18B may be connected to a side arm 20A, 20B via a coupling mechanism 22A, 22B. In some examples, the coupling mechanism 22A, 22B temporarily attaches the support arm 18A, 18B to the side arm 20A, 20B. In these and other implementations, the support arms 18A, 18B are movable along the side arms 20A, 20B and can be affixed temporarily or permanently at various positions along the side arms 20A, 20B. In other examples, the coupling mechanism 22A, 22B permanently attaches the support arm 18A, 18B to the side arm 20A, 20B.

In these and other implementations, each of the side arms 20A, 20B fit into opposing sides of the support base 24. In some examples, the support base 24 may include at least three slots configured to receive the support arms 20A, 20B and the post 26. In some examples, the support base 24 temporarily secures to one or more of the side arms 20A, 20B and the post 26, for example, via pins 28A, 28B. In other examples, the support base 24 permanently secures to one or more of the side arms 20A, 20B and the post 26. In certain implementations, a pin 28C affixes the post 26 to the support base 24.

As is also shown in FIGS. 2A-2B, the post 26 extends upward from the support base 24. A vertical support 30 may be attached to the post 26 via support mechanism 32. In some cases, the vertical support 30 is configured to engage with a bike's 2 frame to provide additional support to the bike 2, such as to prevent the bike 2 from tipping over, as would be understood by a skilled artisan. The vertical support 30 may be adjusted to be secured at different heights along post 26 via support mechanism 32, which will be discussed in greater detail with respect to FIG. 7.

Continuing with FIGS. 2A-2B, a brace 34 may couple the support base 24 to the center beam 36. In some cases, the brace 34 permanently attaches the support base 24 to the center beam 36. In other cases, the brace 34 temporarily attaches the support base 24 to the center beam 36. Additionally or alternatively, a hitch beam 38 may also be attached to the center beam 36 on the opposing side of the support base 24. In some cases, the brace 34 permanently attaches the hitch beam 38 to the center beam 36. In other cases, the brace 34 temporarily attaches the hitch beam 38 to the center beam 36. The hitch beam 38 may be configured to fit into a receiving hitch, which will be discussed in greater detail with respect to FIG. 3. When the bike rack 10 is mounted on a vehicle via the hitch beam 38, the support arms 18A, 18B may extend away from the vehicle, such as in the opposite direction of the hitch beam 38.

Also shown in FIGS. 2A-2B, the center beam 36 may be attached to a linear slide 40. In various implementations, the center beam 36 and the linear slide 40 may be parallel to each other. In some examples, the center beam 36 permanently attaches to the linear slide 40. In other examples, the center beam 36 temporarily attaches to the linear slide 40. The linear slide 40 may be configured to extend and retract such that the brace 34 and the components attached thereto (e.g., the support brackets 12A, 12B, the support base 24, and the vertical support 30) are moved between a loading position and a transport position, which will be discussed in greater detail with respect to FIG. 5. Additionally, the movement of the linear slide 40 may be electrically controlled via a control hub 42, as would be understood by a skilled artisan, and will be discussed further below.

Continuing with FIGS. 2A-2B, the control hub 42 may include an actuator switch 44 and a power source 46. In some examples, the power source 46 may be a battery 48 that is coupled with the control hub 42 via a dock 50. In other cases, the power source 46 may include a solar panel or power cord or the like, as would be readily understood by the skilled artisan.

Figure 3:
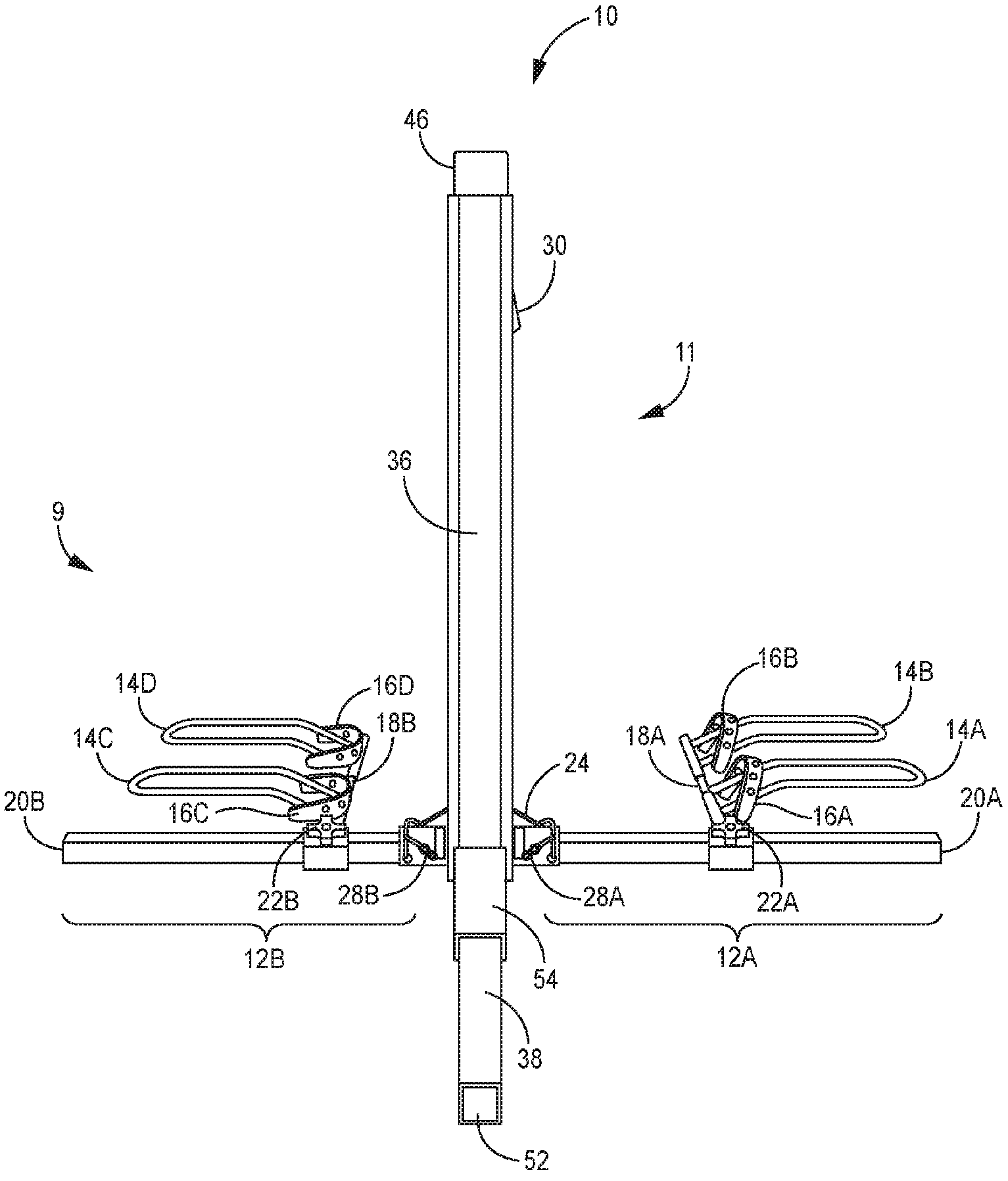
FIG. 3 is a rear view of the bike rack, according to one implementation.

Turning now to FIG. 3, the bike rack 10 may include a hitch beam 38. The hitch beam 38 may be attached to the center beam 36 on the opposing side of the support base 24. In certain implementations, a mount 54 may attach the hitch beam 38 to the center beam 36. In some examples, the mount 54 may be configured such that the center beam 36 may tilt relative to the hitch beam 38 and the vehicle, as will be discussed in greater detail with respect to FIG. 8.

Continuing with FIG. 3, the hitch beam 38 may be configured with an end 52 that fits into a receiving hitch or other hitch of a vehicle, as would be readily understood by the skilled artisan. When the bike rack 10 is mounted on a vehicle via the hitch beam 38, the support arms 18 may extend away from the vehicle, such as in the opposite direction that the hitch beam 38 extends from the center beam 36. In some cases, the brace 54 may be attached to the inner portion of the center beam 36, as will be discussed in greater detail with respect to FIG. 5.

Figure 4:
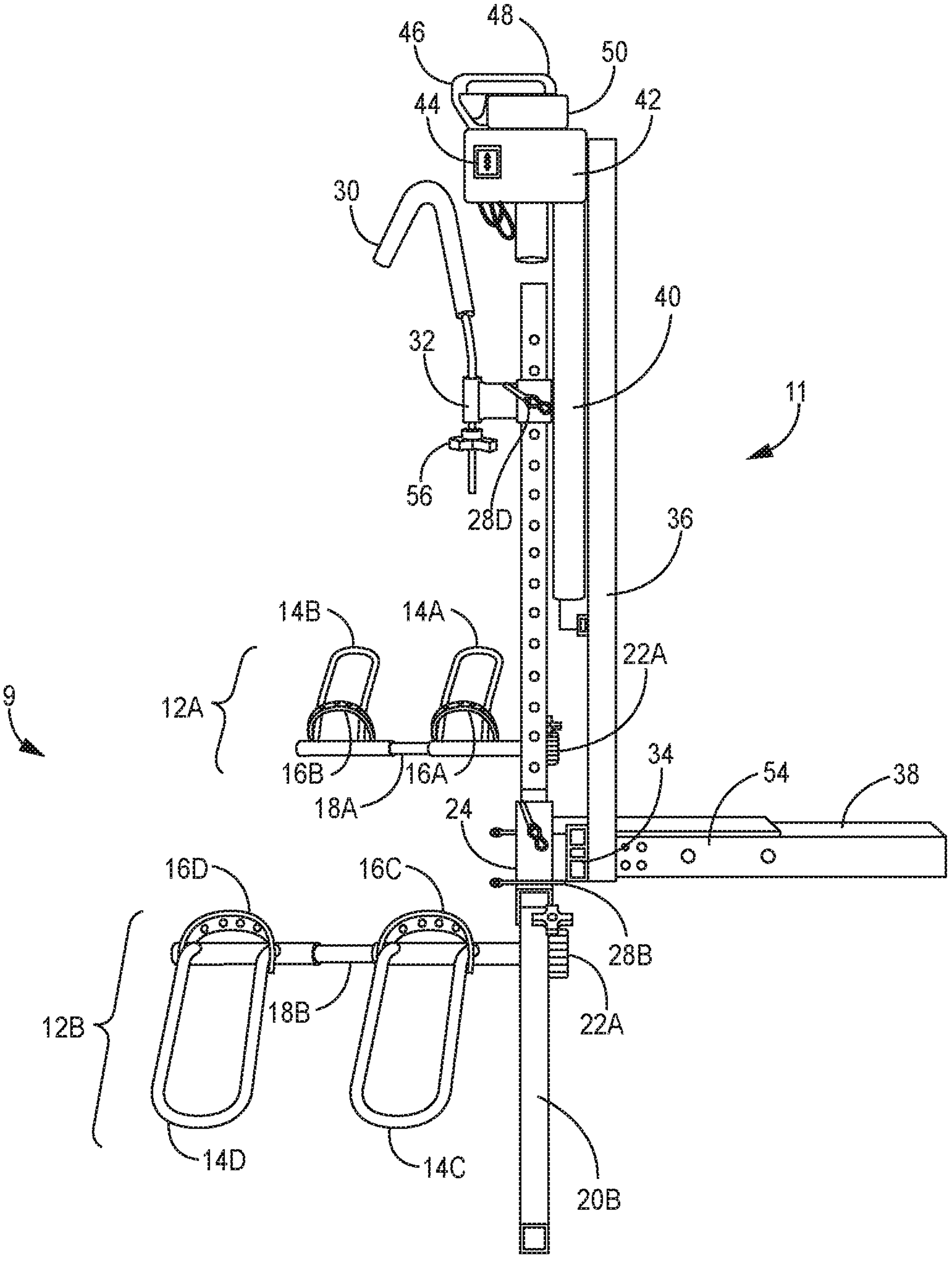
FIG. 4 is a side view of the bike rack, according to one implementation.

FIG. 4 shows a side view of the bike rack 10. The bike rack 10 includes the post 26 that may extend upward from the support base 24. The vertical support 30 may be attached to the post 26 via the support mechanism 32, as discussed above. In certain implementations, the vertical support 30 may pass through the support mechanism 32 such that the vertical support 30 extends above and below the support mechanism 32. In these and other implementations, a fastener 56 may engage with the vertical support 30 below the support mechanism 32 to tighten the vertical support 30 to the support mechanism 32. The support mechanism 32 may be attached to the post 26 via a pin 28D inserted through one or more openings in the post 26, as would be readily understood by the skilled artisan. In some examples, the support mechanism 32 may be adjusted at different heights along the post 26, which will be discussed in greater detail with respect to FIG. 7.

Figure 5:
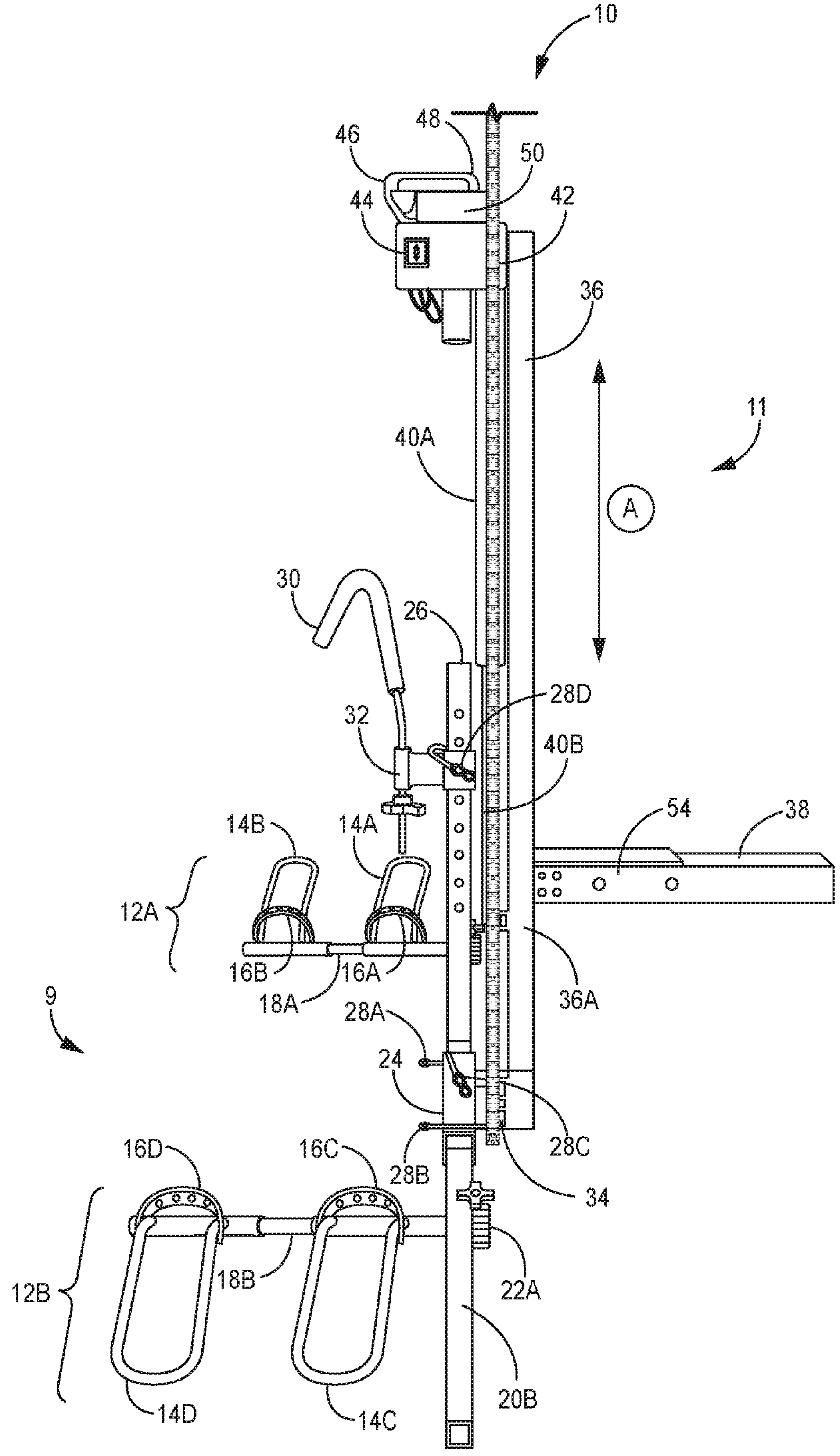
FIG. 5 is a side view of the bike rack in a raised position, according to one implementation.

As is shown in the implementation of FIG. 5, the bike rack 10 may be in a lowered loading position such that the support brackets 12A, 12B are touching the ground while hitch beam 38 is at a different height, above the brace 34. Specifically, the bike rack 10 is in an extended state (as shown by reference arrow A) based on the extension of the linear slide 40 and the center beam 36. For example, the center beam includes an outer portion 36A and an inner portion 36B, where the outer portion 36A slides over the inner portion 36B. The linear slide 40 includes an outer portion 40A and an inner portion 40B, where the outer portion 40A slides over the inner portion 40B. As would be readily understood by the skilled artisan, the inner and outer portions of the linear slide 40A, 40B and the center beam 36A, 36B may be switched if the ability to extend is preserved.

Continuing with FIG. 5, the outer portion of the center beam 36A is attached to the inner portion of the linear slide 40B and the brace 34, which is attached to the support base 24 and the support brackets 12. The inner portion of the center beam 36B is attached to the outer portion of the linear slide 40A, the hitch beam 38 via mount 54, and the control hub 42. Additionally or alternatively, the outer portion of the linear slide 40A is attached to the control hub 42, as would be readily understood by the skilled artisan.

As is also shown in FIG. 5, the control hub 42 includes a power source 46 (e.g., a battery 48 and a dock 50) and an actuator switch 44 in communication with the power source 46. In some examples, the actuator switch 44 includes an up position, a down position, and an off position. In other examples, the actuator switch 44 may include fewer or more positions, as would be readily understood by the skilled artisan.

When the actuator switch 44 is in the up position, the center beam 36 and the linear slide 40 are configured to compress, which may move the support brackets 12A, 12B up to a transport state. When the actuator switch 44 is in the down position, the center beam 36 and the linear slide 40 are configured to extend, which may move the support brackets 12A, 12B down to a loading state. When the actuator switch 44 is in the off position, the center beam 36 and the linear slide 40 are configured to be locked into place in a compressed or extended state or any state therebetween.

Figure 6:
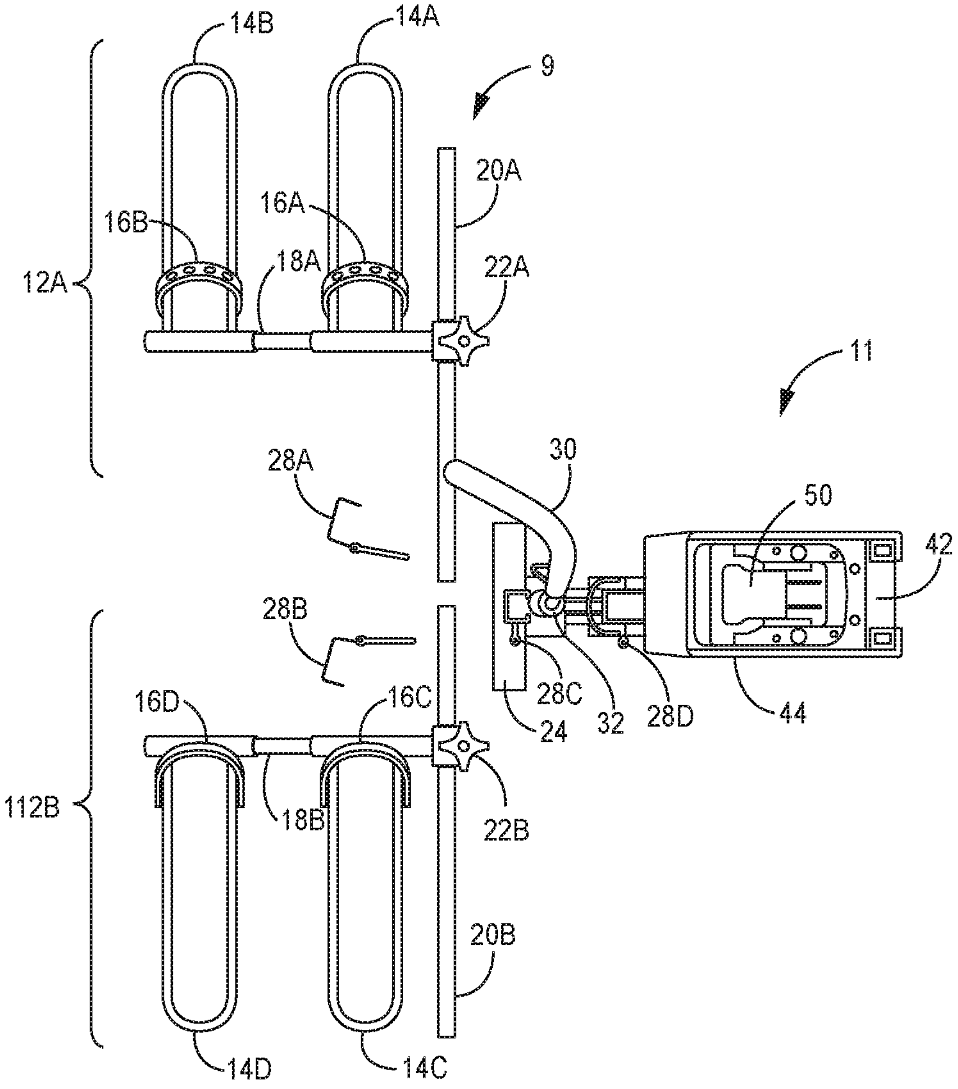
FIG. 6 is a top view of the bike rack, according to one implementation.

FIG. 6 shows a top view of the bike rack 10. In this example, the pins 28A, 28B are removed from the support base 24 such that the support brackets 12A, 12B are separated from the support base 24. Specifically, the pin 28A may removably attach the support bracket 12A to the support base 24 via the side arm 20A, and the pin 28B may removably attach the support bracket 12B to the support base 24 via the side arm 20B, as would be readily understood by the skilled artisan. Other modular components, such as a ski rack, may be fitted to the support base 24 or the support arms 20. As is also shown in the implementation of FIG. 6, the battery 48, or other power source, is removed from the dock 50, for example, for charging, as would be readily understood by the skilled artisan.

Figure 7:
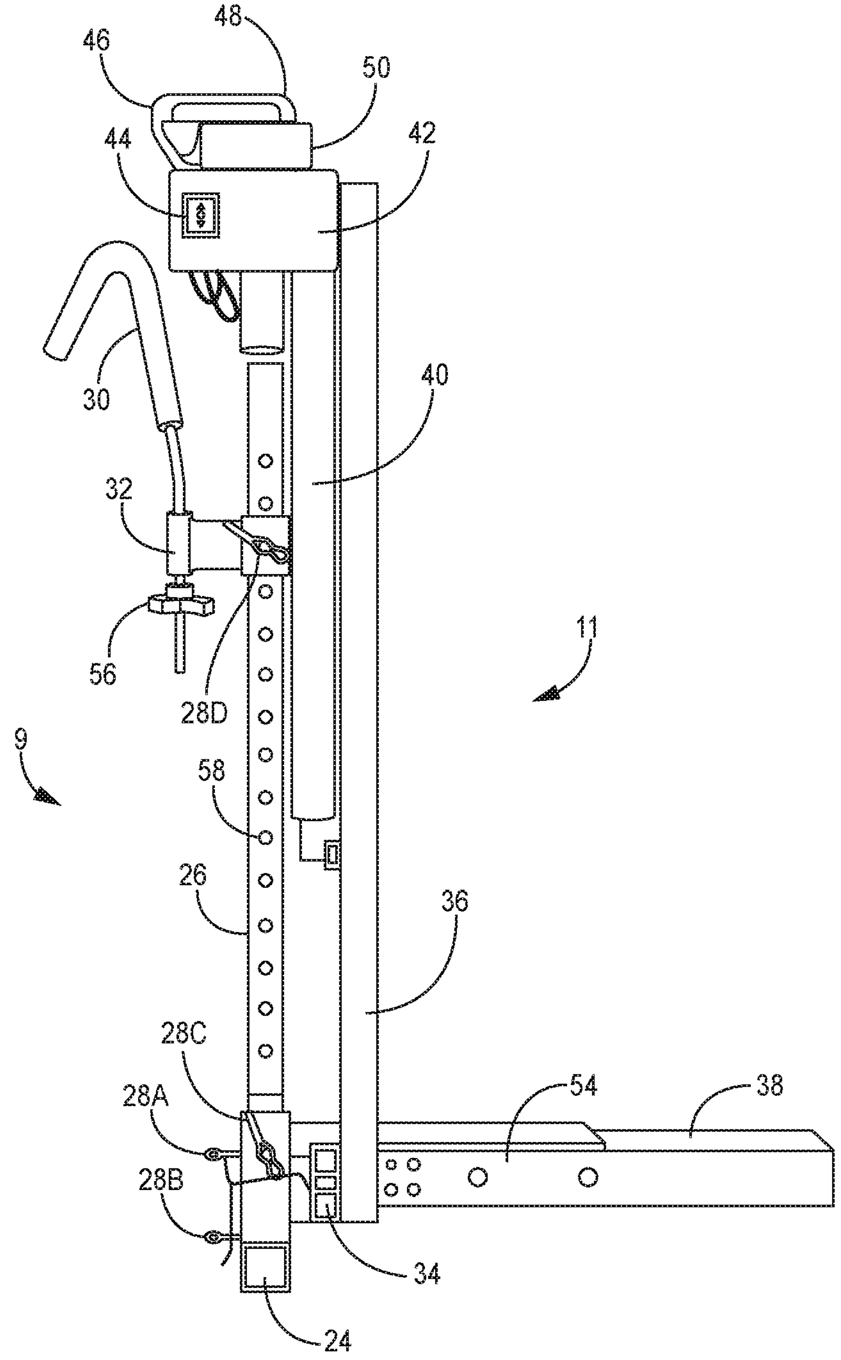
FIG. 7 is a side view of the bike rack in a lowered position, according to one implementation.

FIG. 7 shows a side view of the bike rack 10 in a compressed or raised, transport state. In some examples, the vertical support 30 may be adjusted at different heights along the post 26 via the support mechanism 32. More specifically, the support mechanism 32 may be attached to the post 26 via the pin 28D. The post 26 may include a plurality of pin openings 58. To adjust the height of the vertical support 30, the pin 28D may be removed from a first pin opening 58, the support mechanism 32 may then be aligned with a second pin opening 58 at a new height on the post 26, and then the pin 28D may be reinserted such that the support mechanism 32 is attached at the new height. Various additional mechanisms for adjusting the height and location of the support mechanism 32 along the post 26 would be recognized by those of skill in the art, such as, but not limited to, rack and pinion attachments and frictional attachments.

The vertical support 30 may be configured at different heights to engage with different parts of a bike 2 or different size bikes. In one example, the vertical support 30 may engage with the seat on a bike. In another example, the vertical support 30 may engage with a top bar or cross bar on a bike. As would be readily understood by the skilled artisan, the vertical support 30 may engage with other parts of a bike. It would further be appreciated that the bike rack 10 may include more than one vertical support 30. For example, for racks 10 configured to support more than one bike 2 the rack 10 may include a number of vertical supports 30 equal to the number of bikes 2 to be supported.

Figure 8:
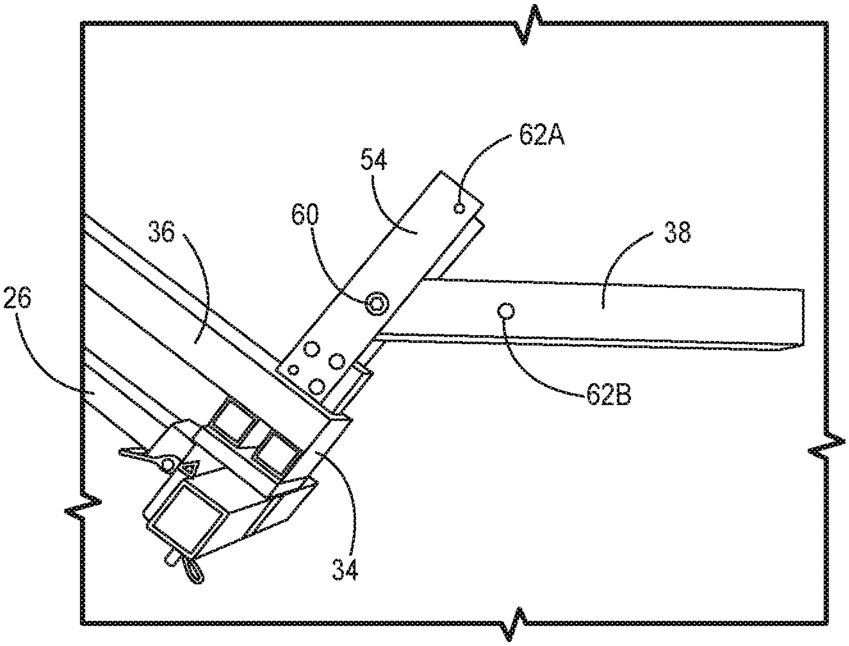
FIG. 8 is a detailed view of the tiltable hitch system of the bike rack, according to one implementation.
Figure 9A:
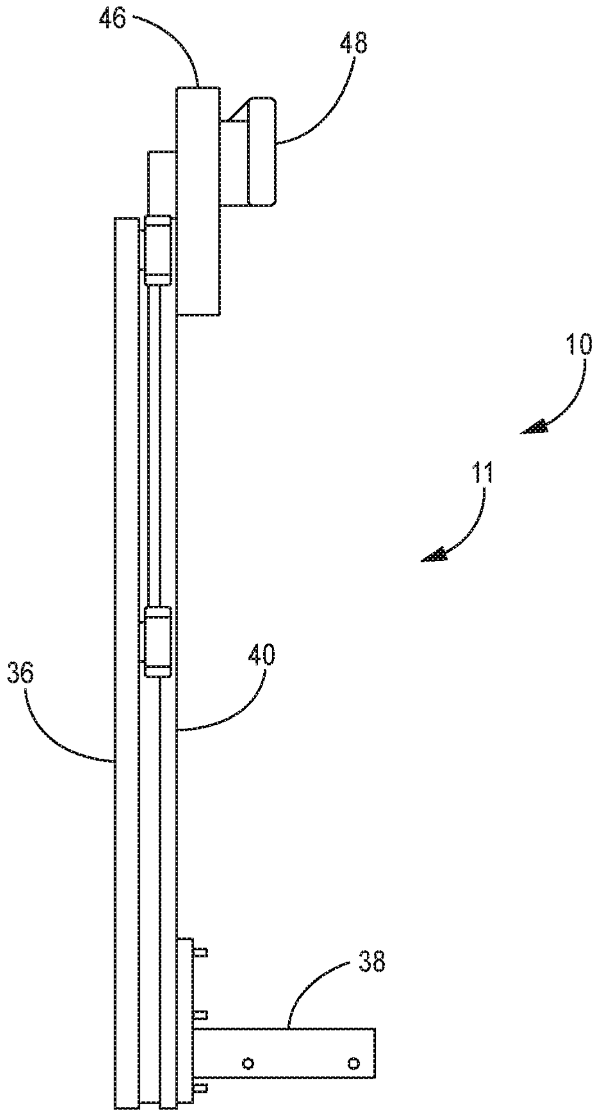
FIG. 9A is a side of view a rack, according to one implementation.
Figure 9B:
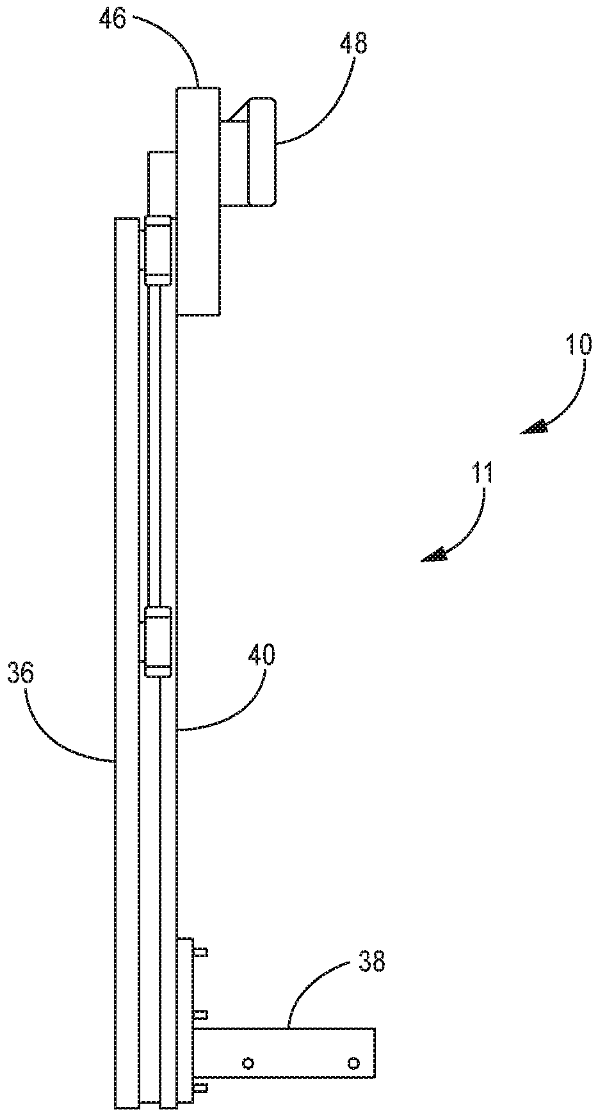
FIG. 9B is a side view of a rack without a bike holder, according to one implementation.
Figure 9C:
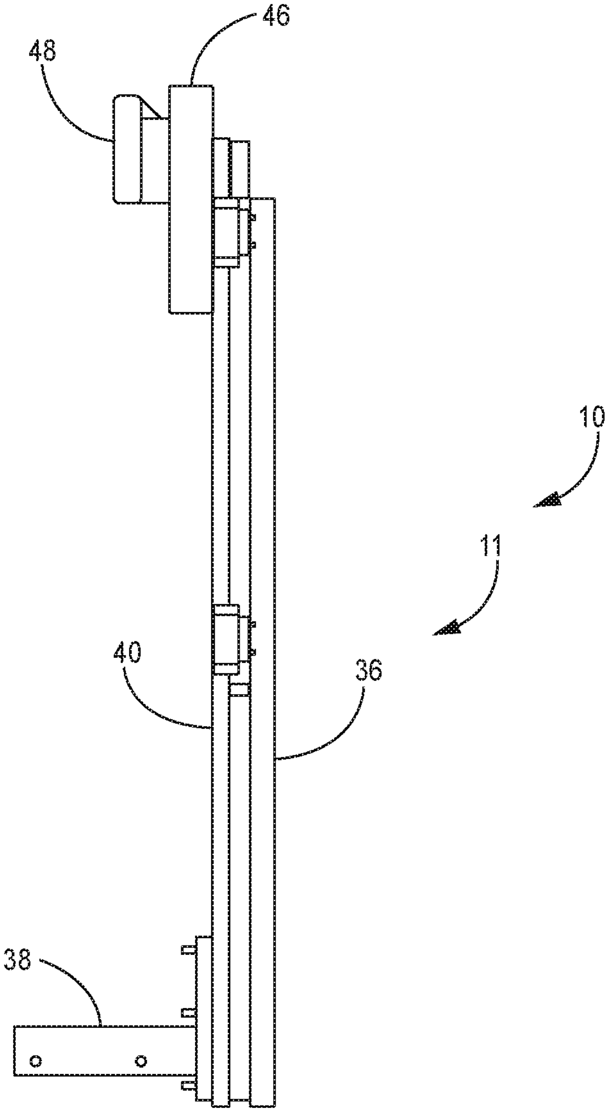
FIG. 9C is a side view of a rack without a bike holder, according to one implementation.
Figure 9D:
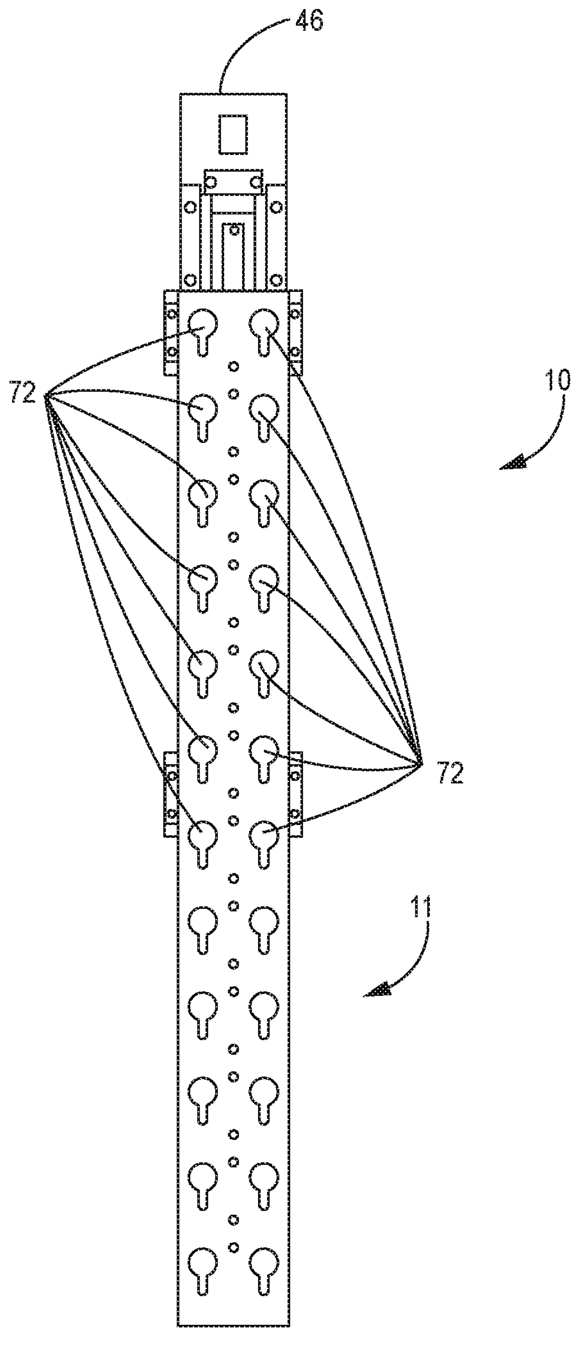
FIG. 9D is a front view of a rack with notched post for holder placement of a bike holder, according to one implementation.
Figure 9E:
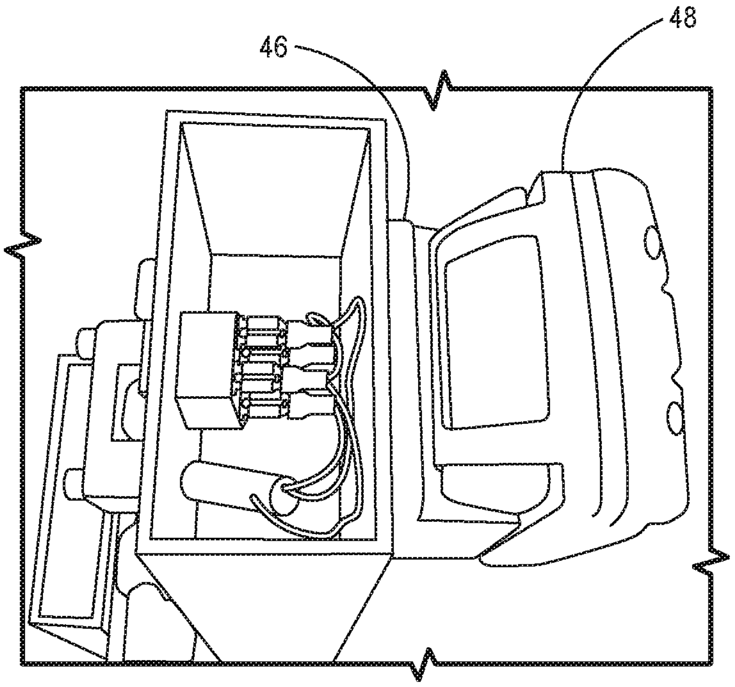
FIG. 9E is a top view of a control hub, according to one implementation.
Figure 9F:
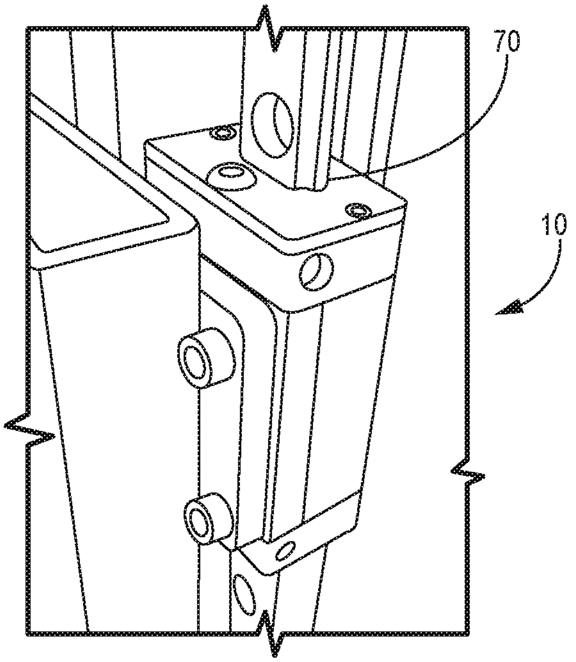
FIG. 9F is a perspective view of a wiper in communication with a slide, according to one implementation.
Figure 9G:
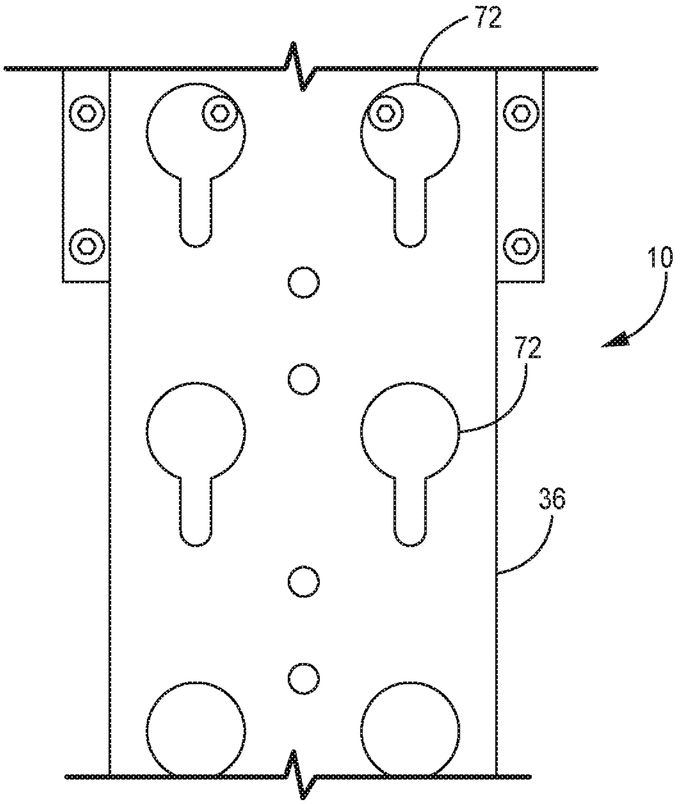
FIG. 9G is a close-up view of notches in the post, according to one implementation.

Turning to FIG. 8, the mount 54 may be configured to allow the center beam 36 to tilt relative to the hitch beam 38 and the vehicle, such as to allow for easier access to the back of the vehicle (e.g., the vehicle's trunk) while the bike rack 10 is mounted to the vehicle via the hitch beam 38. The mount 54 may tilt at an axis 60. Additionally, the mount 54 may be locked onto the hitch beam 38 in a non-tilted state for loading and transporting bikes. The mount 54 may be locked by inserting a pin (not pictured) through the openings 62A and 62B when the openings 62A and 62B are aligned as shown, for example, in FIG. 7.

FIGS. 9A-9G show further configurations and features of a rack 10, according to certain implementations. In these implementations, for example, various components of the bike rack 10 can be comprised of metal, such as steel or aluminum. In further implementations, composites and/or plastics may be used for certain features.

In various implementations, wipers 70 can be provided to prevent the accumulation of dirt and other debris on the center beam 36/linear slide 40, as would be appreciated by those of skill in the art.

In certain implementations, the power source 46 such as the battery 48 can be mounted to the fore or aft of the rack 10, as would be appreciated. That is in various implementations, certain aspects of the control hub 42 can be mounted on either side of the rack 10 for ease of use, control and the like.

In various implementations, the center beam 36 can comprise a variety of openings 72 or notches configured for the modular placement of support brackets 12A, 12B, discussed above, as well as various attachments and other accessories, as would be appreciated by those of skill in the art.

Further, in certain implementations, a plurality of power sources 46 and/or extension mechanisms (also referred to as sliders) 11 can be provided. For example, in certain applications, more lifting power may be desirable, and two extension mechanisms 11 can be provided, spaced on either side of the center of the rack. It is understood that further configurations are of course possible.

Figure 10:
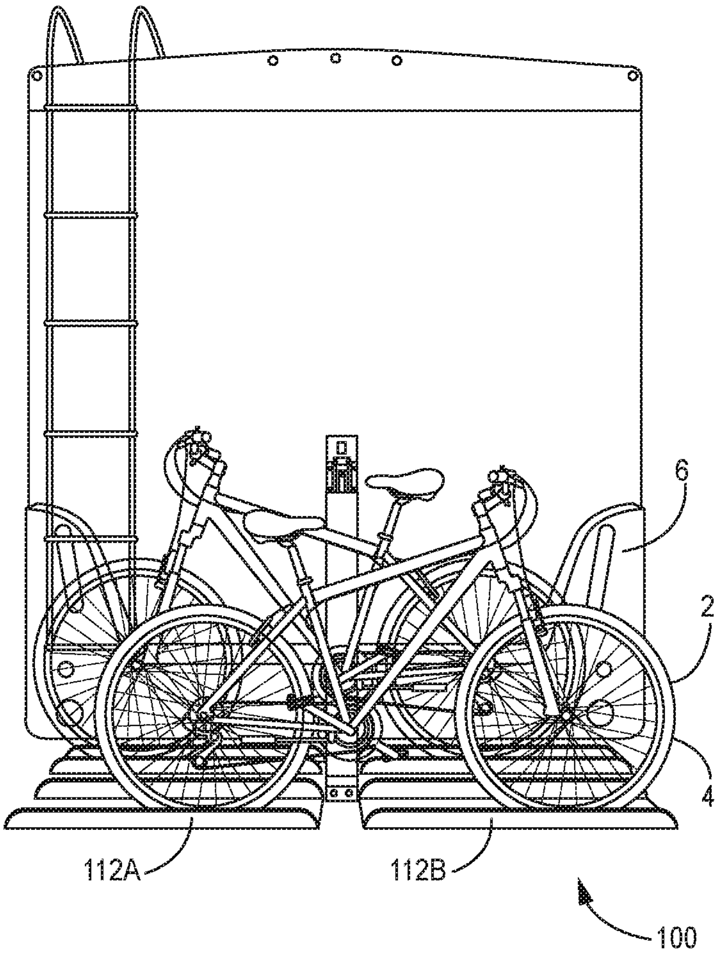
FIG. 10 is a front view of a rack in use with the bikes loaded on a vehicle, according to one implementation.

FIGS. 10-35 show another exemplary implementation of the bike rack 100 operating on a substantially similar principal as the rack 10 described elsewhere herein. Various features are similar throughout the embodiments and implementation and therefore for the sake of clarity are not discussed in each and every figure in which they appear. FIG. 10 depicts the bike rack 100 mounted to a vehicle 6, in this case an RV, with two bikes 2 loaded on the rack 100 in a raised position. In these and other implementations, the bikes 2 are placed in parallel and wheels 4 placed on support brackets 112A, 112B. In these implementations, an actuator may cause the rack to move between raised and lowered positions.

Figure 11:
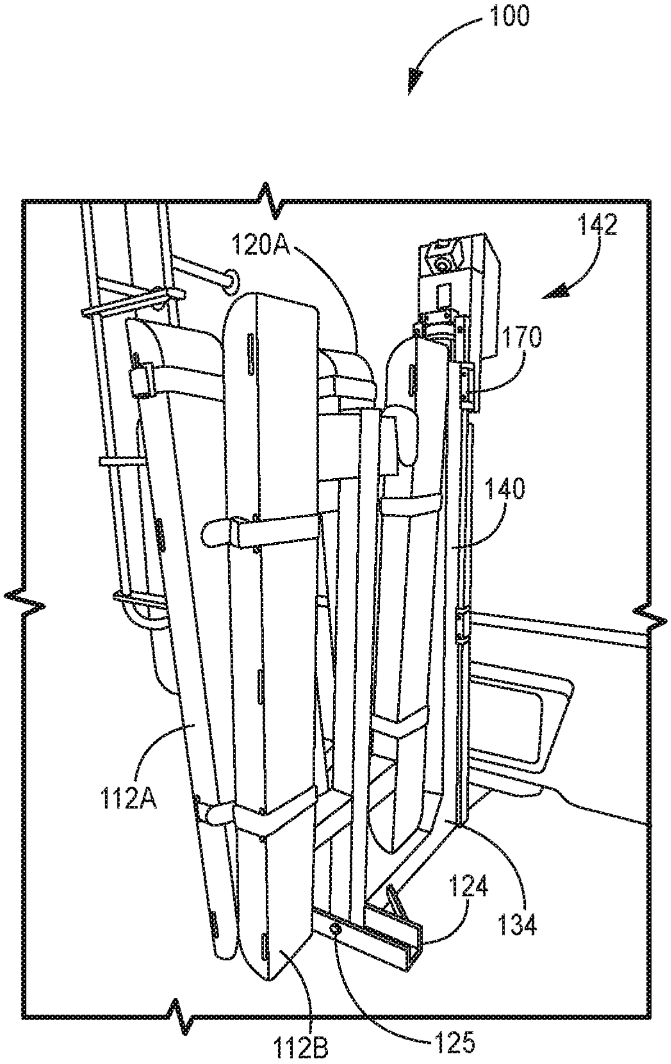
FIG. 11 is a perspective view of a rack in a folded position attached to a vehicle, according to one implementation.

FIG. 11 shows the rack 100 in a folded position. As would be appreciated, when the rack 100 is not in use the support brackets 112A, 112B may be folded vertically to into a compact position. In these and other implementations, support arms 120A are affixed to a support brace 124 and can optionally be rotated on an axis 125 into the compact folded position.

Figure 12:
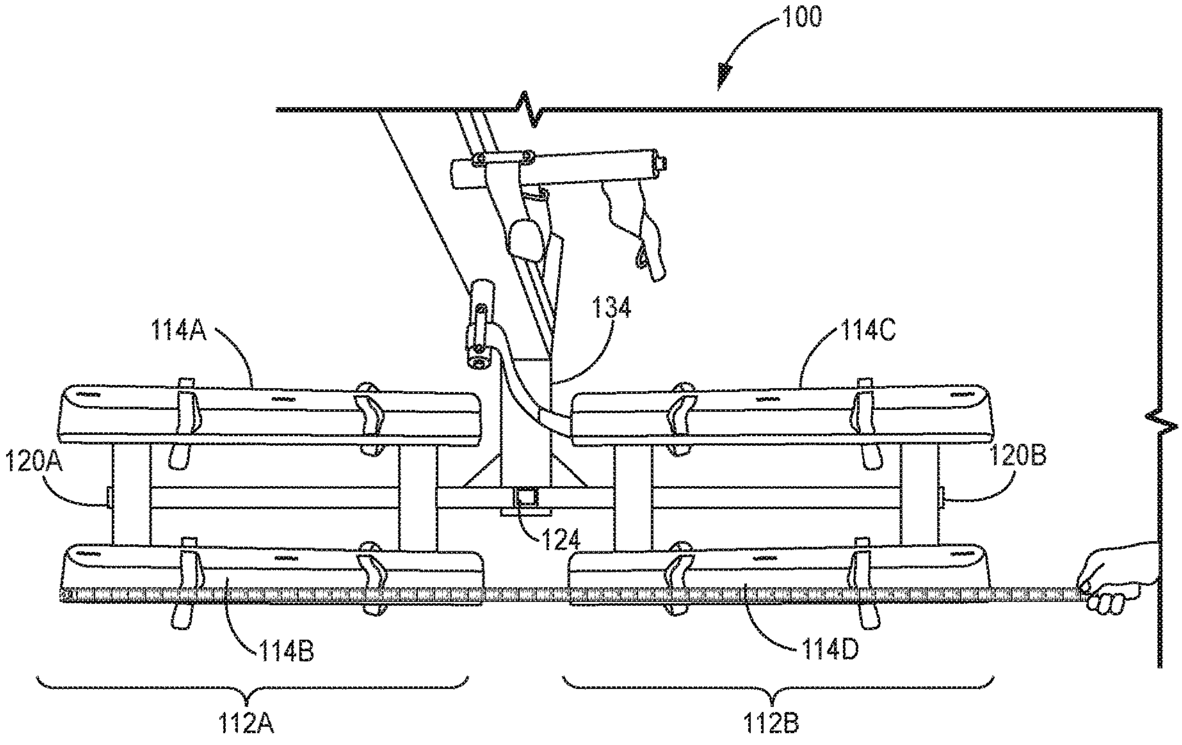
FIG. 12 is a top view of a rack in an extended position, according to one implementation.

FIG. 12 shows the rack 100 fully extended. In the fully extended state the rack 100 may be approximately 72 inches wide, although the width may be more or less depending on the use case for the rack 100. As can be seen, in these and other implementations, the support brackets 112A, 112B include wheel supports 114A, 114B, 114C, 114D that are trays or platforms. In these implementations, the wheel supports 114A, 114B, 114C, 114D are configured such that a wheel 4 of a bike can rest with the platform.

Figure 13:
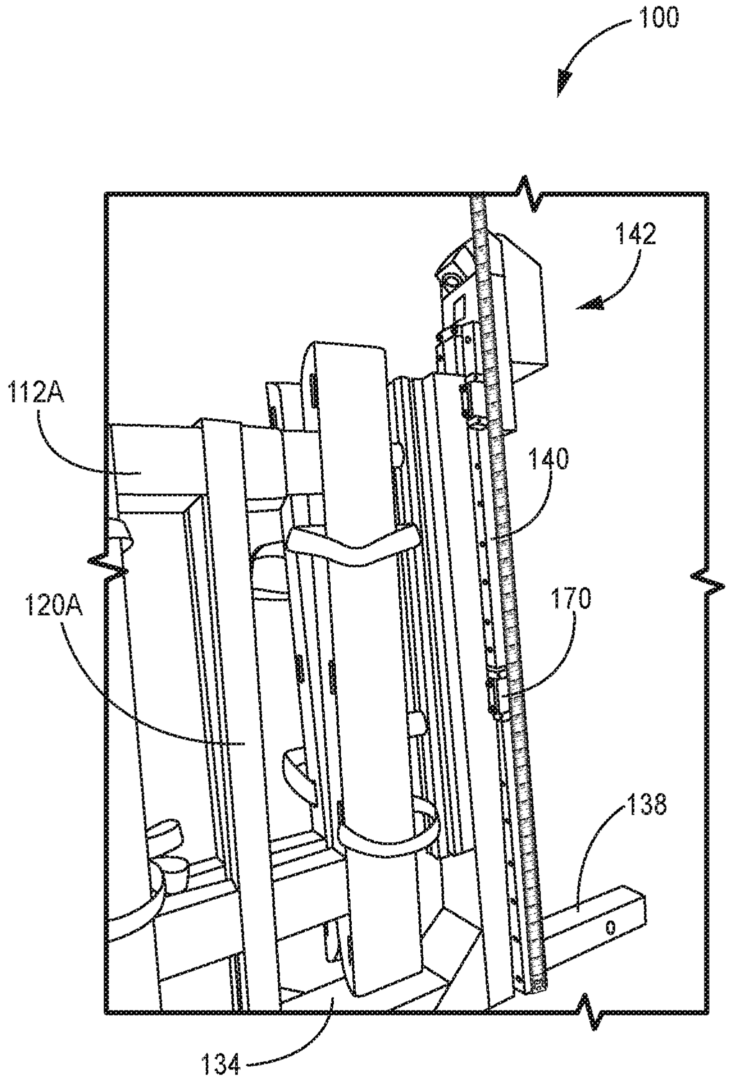
FIG. 13 is a perspective view of a rack in a folded position, according to one implementation.

FIG. 13, shows another view of the rack 100 in a folded state. In various implementations, the rack 100 may have an overall height of about 45 inches in these configured. Of course, other dimensions are possible and are contemplated herein.

Figure 14A:
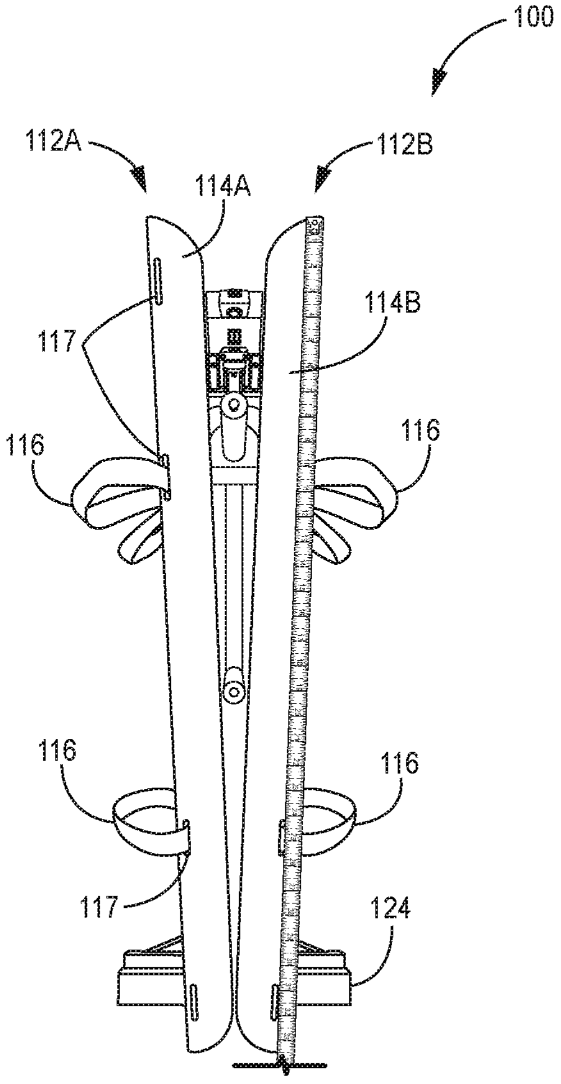
FIG. 14A is a front view of a rack in a folded position, according to one implementation.
Figure 14B:
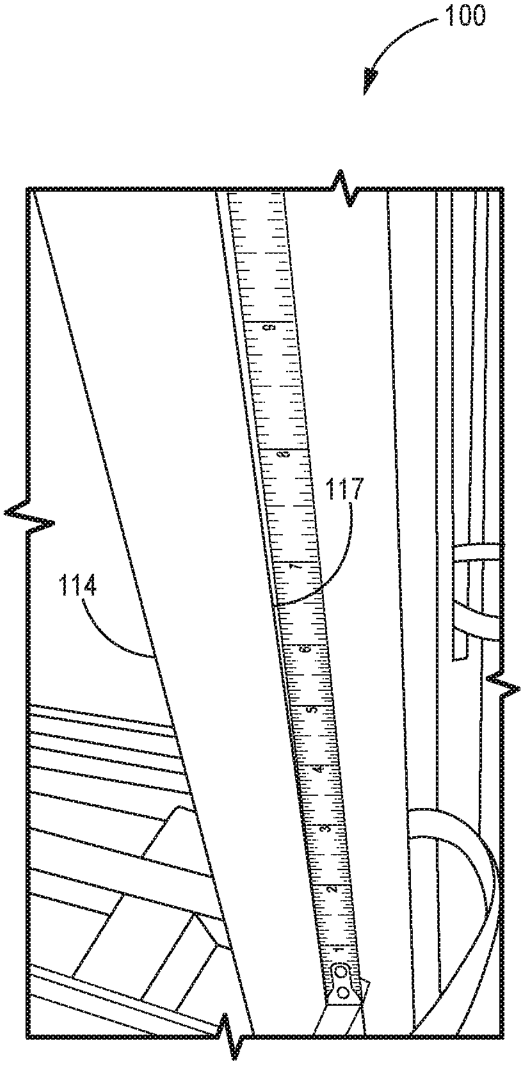
FIG. 14B is a close-up view of a slot, according to one implementation.

Continuing to FIG. 14A, the platforms/wheel supports 114A, 114B, 114C, 114D may have a length of about 32-33 inches. Further in certain specific implementations, the platforms/wheel supports 114A, 114B, 114C, 114D includes straps 116 configured to be inserted though slots 117. The straps 116 are configured to secure wheels 4 to the platforms. The slots 117 may be about 1.25 inches by 7 inches. The slots 117 may be disposed at various intervals along the platforms/wheel supports 114A, 114B, 114C, 114D. Another view of the slots 117 is shown in FIG. 14B. In certain implementations the straps 116 are one inch wide and 24 inches long. Each platform/wheel support 114A, 114B, 114C, 114D may include one, two, or more straps. Various configurations of straps 116 and slots 117 would be appreciated by those of skill in the art in light of this disclosure.

Figure 15:
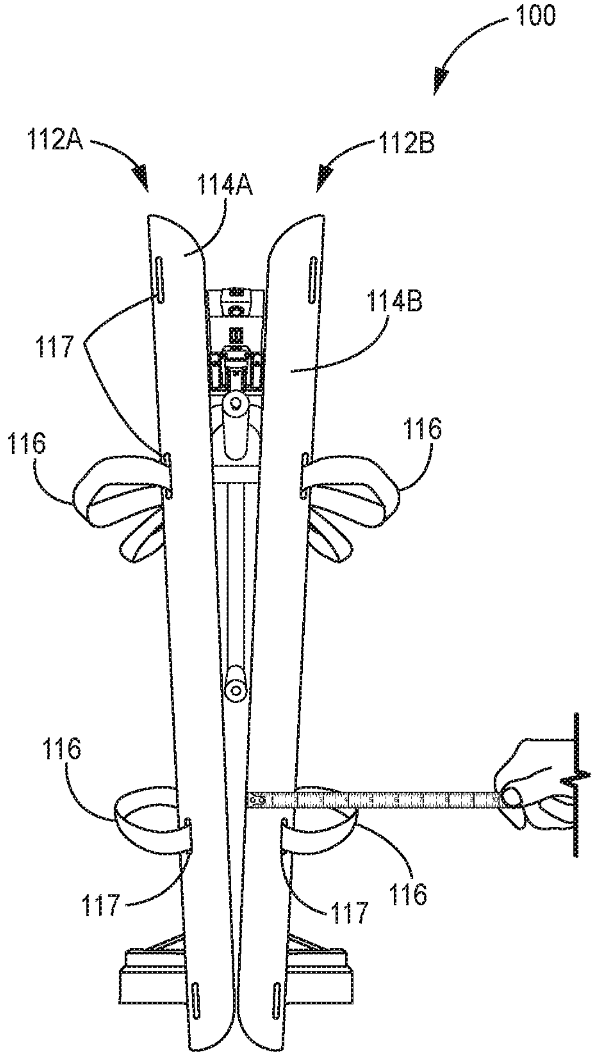
FIG. 15 is a front view of a rack in a folded position, according to one implementation.

As shown in FIG. 15 the platforms/wheel supports 114A, 114B, 114C, 114D may have a lip. In certain implementations, the lip may be about 2 inches wide. Of course, in certain implementations, the platforms/wheel supports 114A, 114B, 114C, 114D may not have a lip. In various implementations, the platforms/wheel supports 114A, 114B, 114C, 114D have rounded corners. The rounded corners may have a 2 inch or other appropriately sized radius.

Figure 16:
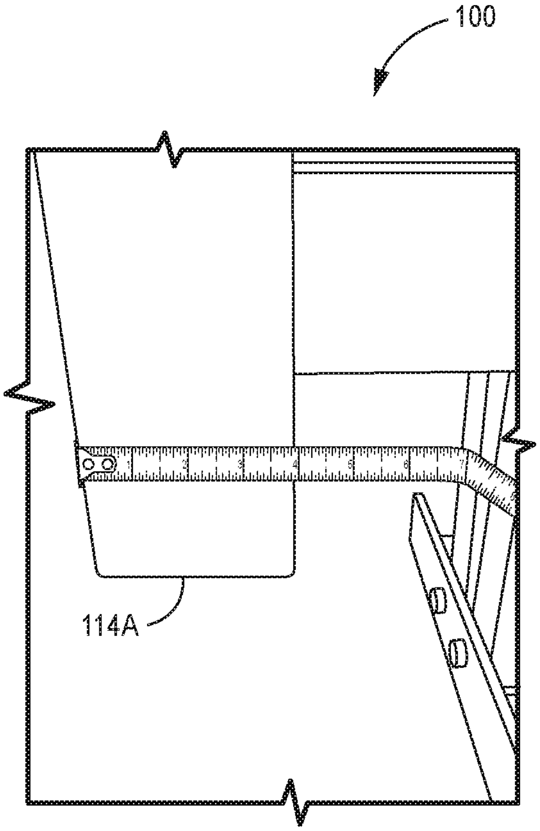
FIG. 16 is a bottom view of a wheel support/platform, according to one implementation.

FIG. 16 shows a bottom view of a platforms/wheel support 114A, 114B, 114C, 114D. In certain implementations, the platforms/wheel supports 114A, 114B, 114C, 114D are about 4 inches wide. Of course, the dimensions could vary depending on the use of the rack 100.

Figure 17:
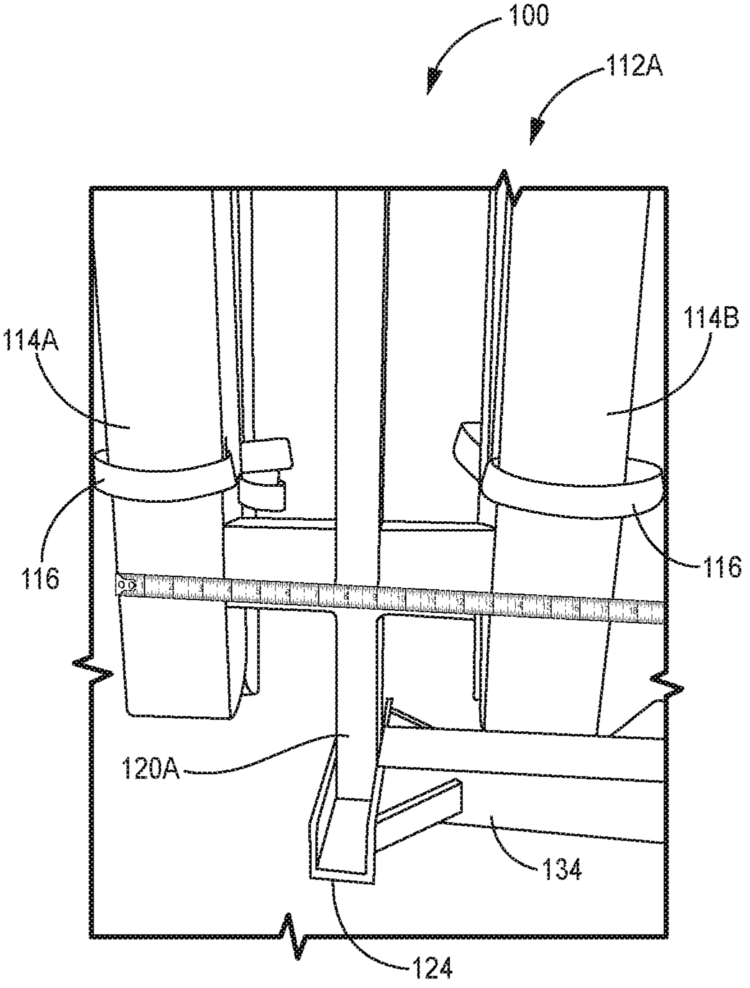
FIG. 17 is a bottom view of a support bracket, according to one implementation.

FIG. 17 shows a bottom view of a double platform bracket 112A. As would be appreciated, a double platform bracket 112A may be configured to transport two bikes. In these implementations, the double bracket 112A is about 117 inches wide. Of course, the dimensions may be varied such as to be about 11 inches wide or less. In the implementation shown in FIG. 17 each platform 114A, 114B is equidistant from the support arm 120A. Alternative implementations are possible where the platforms 114A, 114B are asymmetrically located about the support arm 120A.

Figure 18:
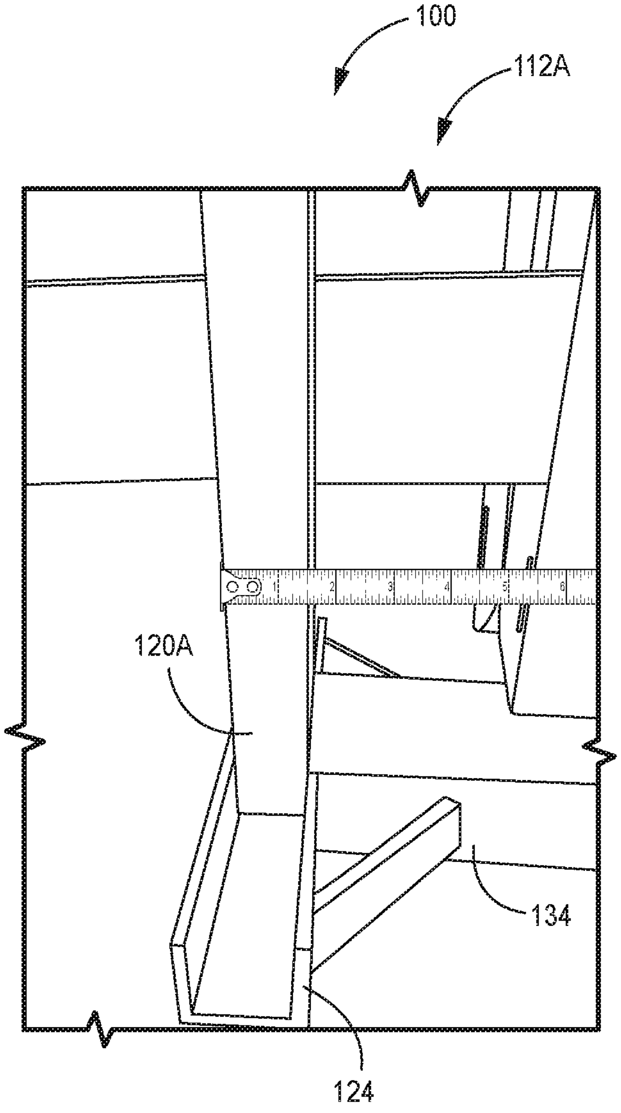
FIG. 18 is a bottom view of a support arm, according to one implementation.

Continuing to FIG. 18 the support arm 120A of the bracket 112A is about 1.5 inches wide, while other dimensions are possible and contemplated herein. In certain implementations, the various components of the rack 100 are made with materials of about a ⅛-inch thickness.

Figure 19:
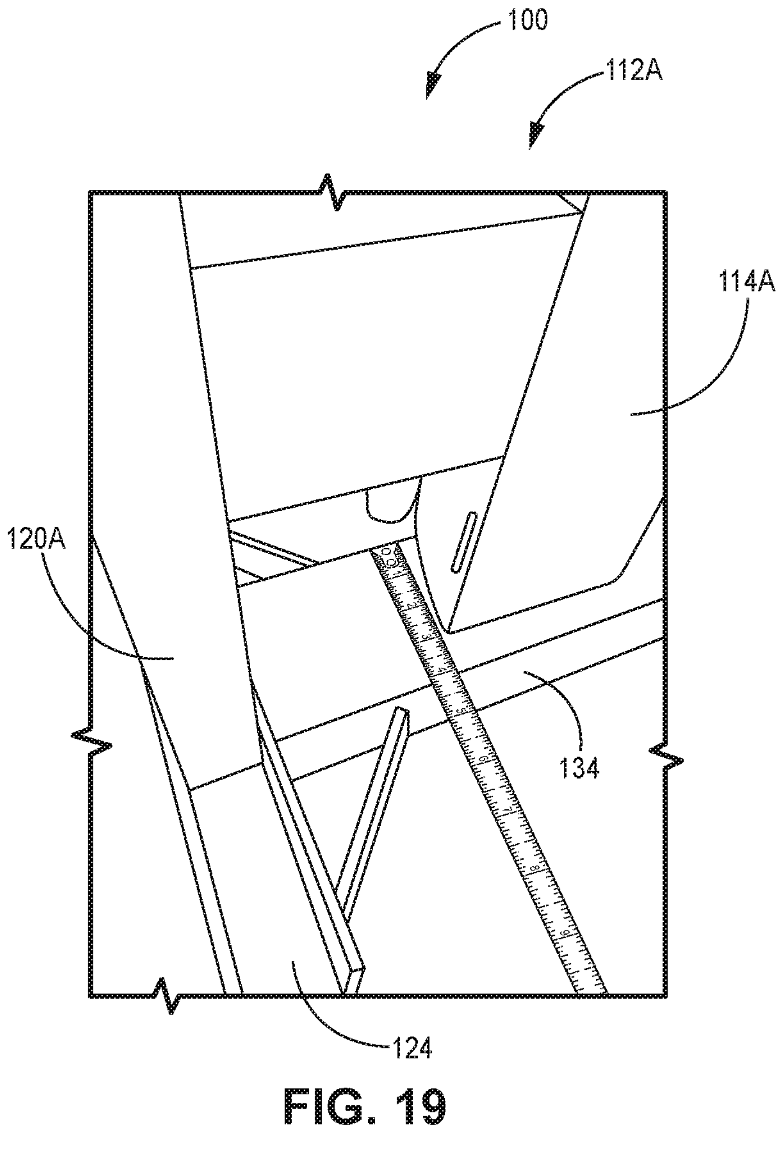
FIG. 19 is a close-up view of a brace, according to one implementation.

In various implementations, the brace 134 may support a support brace 124 that in turn supports the support arms 120A and brackets 112A, as shown for example in FIG. 19. In certain implementations, the brace 134 is about 2×4 inches with a ⅛-inch wall. The support brace 124 may be about 2 inches wide and 12 inches long with a 2-inch lip. Various alternative dimensions are of course possible.

Figure 20A:
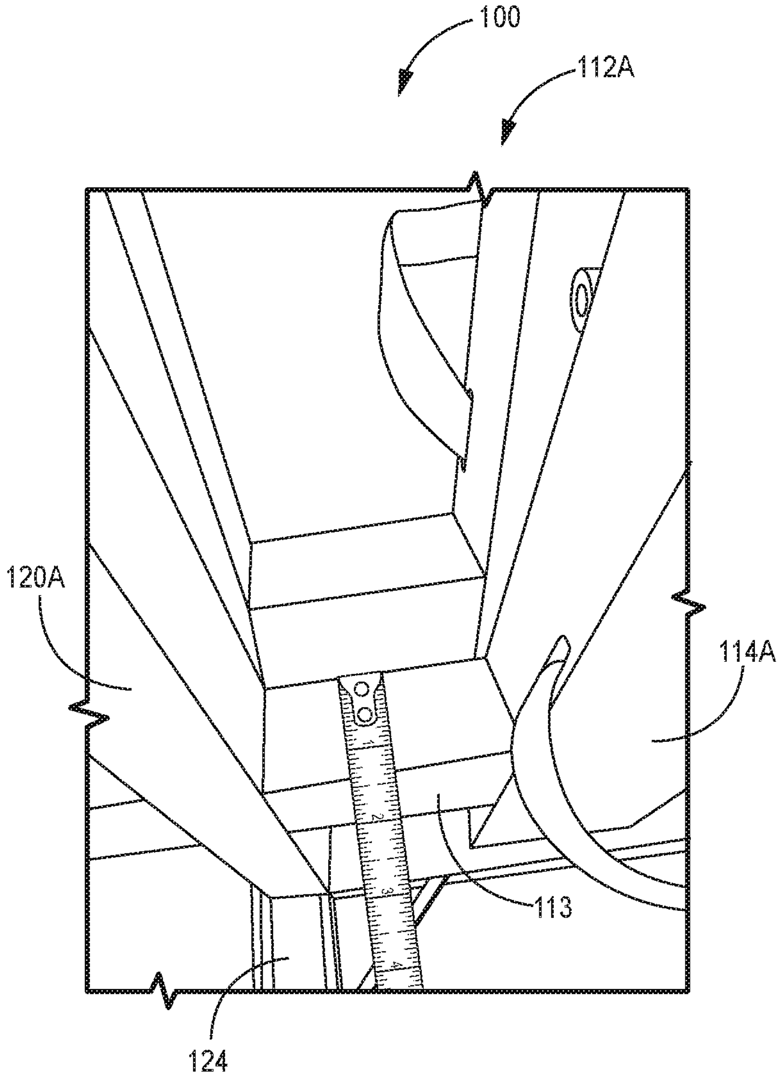
FIG. 20A is a close-up view of a connector, according to one implementation.
Figure 20B:
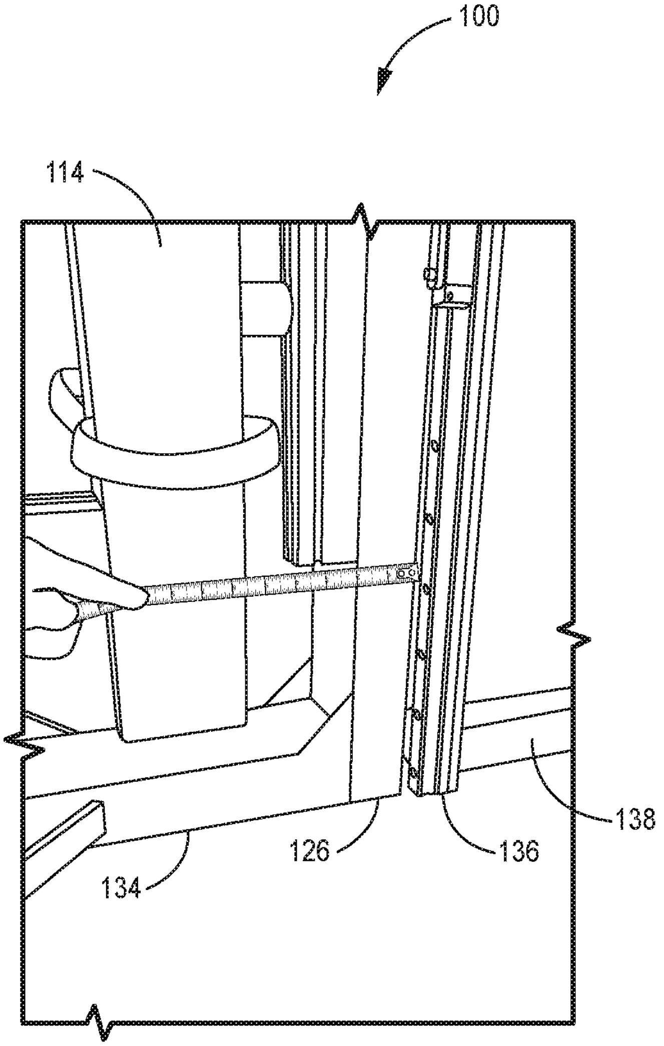
FIG. 20B is a side view of spacing between the post and support bracket, according to one implementation.

The brackets 112A, 112B may support the platforms/wheel supports 114A, 114B, 114C, 114D via one or more connectors 113, as shown for example in FIG. 20A. In certain implementations, the connectors 113 are 3 inches long and 1.5 inches wide. The size and shape of the connectors 113 may vary across various implementations of the rack 100. For example, in asymmetric implementations of the brackets 112A, 112B and rack 100 the connectors 113 may be of various lengths. FIG. 20B shows another view of the rack 100, where the platform 114 is about 3 inches from the post 126.

Figure 21:
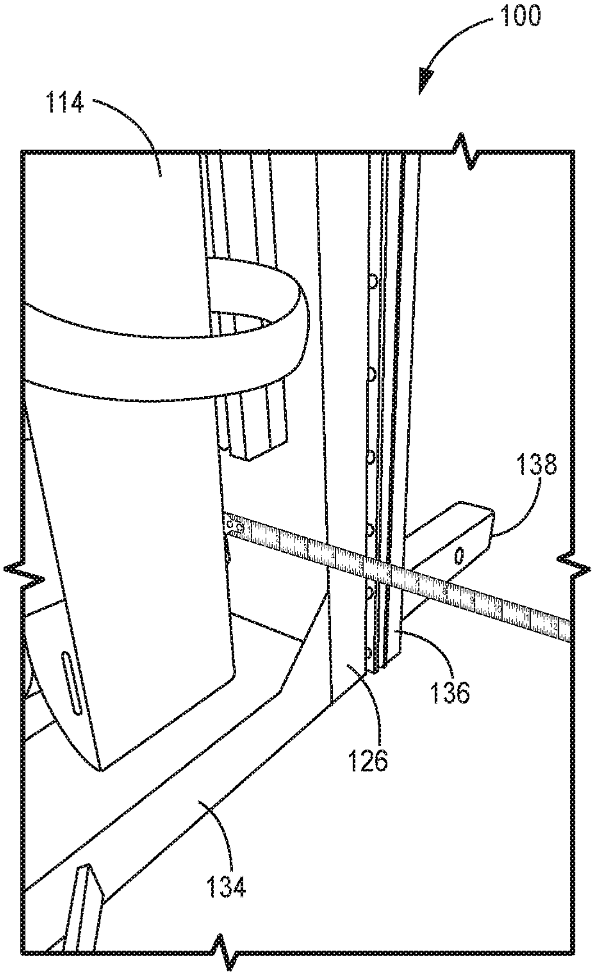
FIG. 21 is a close-up perspective view of the post, according to one implementation.

Turning to FIG. 21, the brace 34 is affixed to a post 126. In certain implementations the brace 134 and post 126 are welded together, to be permanently affixed. In various alternative implementations, including those discussed above, this connection may be temporary. The post 126 and brace 134 may be disposed at a 90-degree angle. In certain implementations, the post 126 is about 4 inches wide and 2 inches in depth. Alternative dimensions and orientations are of course possible.

Figure 22A:
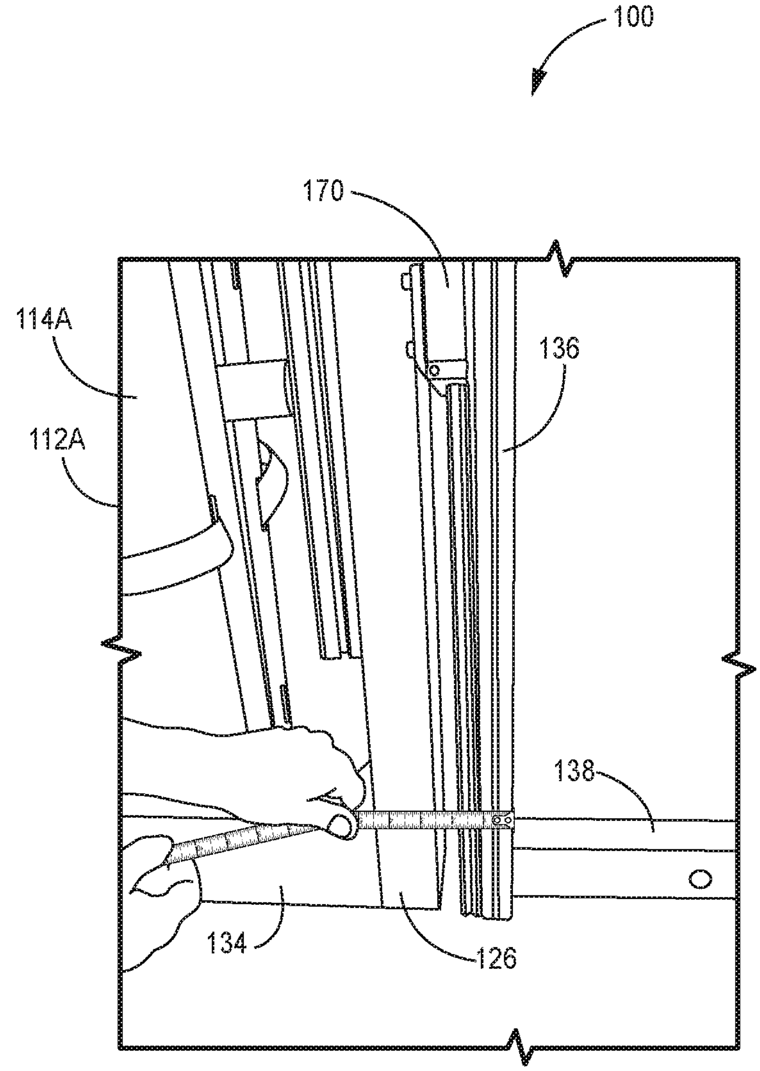
FIG. 22A is a side view of the post and central beam, according to one implementation.
Figure 22B:
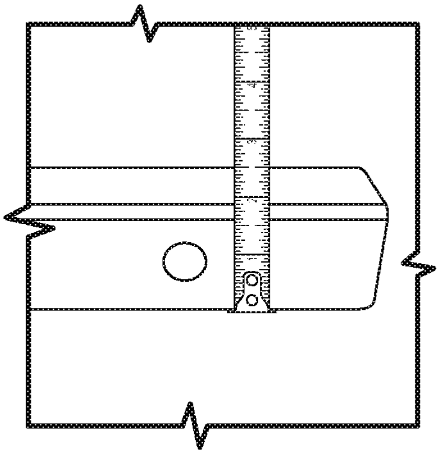
FIG. 22B is a side view of the hitch beam, according to one implementation.

In various implementations, the center beam 136 is 1 inch by 1 inch tubing, optionally steel tubing, shown for example in FIG. 22A. As discussed above, the rack 100 may be attached to a vehicle via a hitch beam 38 configured to attached to a hitch 8 via various known mechanisms, shown in FIGS. 22A-22B. In certain implementations, the hitch beam 38 is a 2 inch by 2-inch beam and approximately 12 inches long. Various shapes, sizes, and configurations of the hitch beam 38 are possible and would be appreciated by those of skill in the art.

Figure 23:
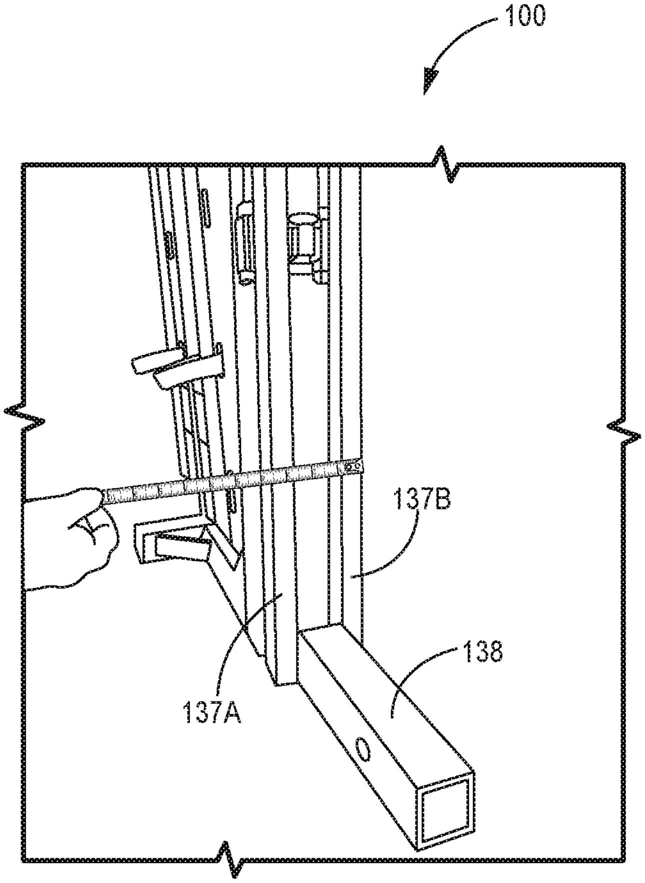
FIG. 23 is a rear view of the rack, according to one implementation.
Figure 24A:
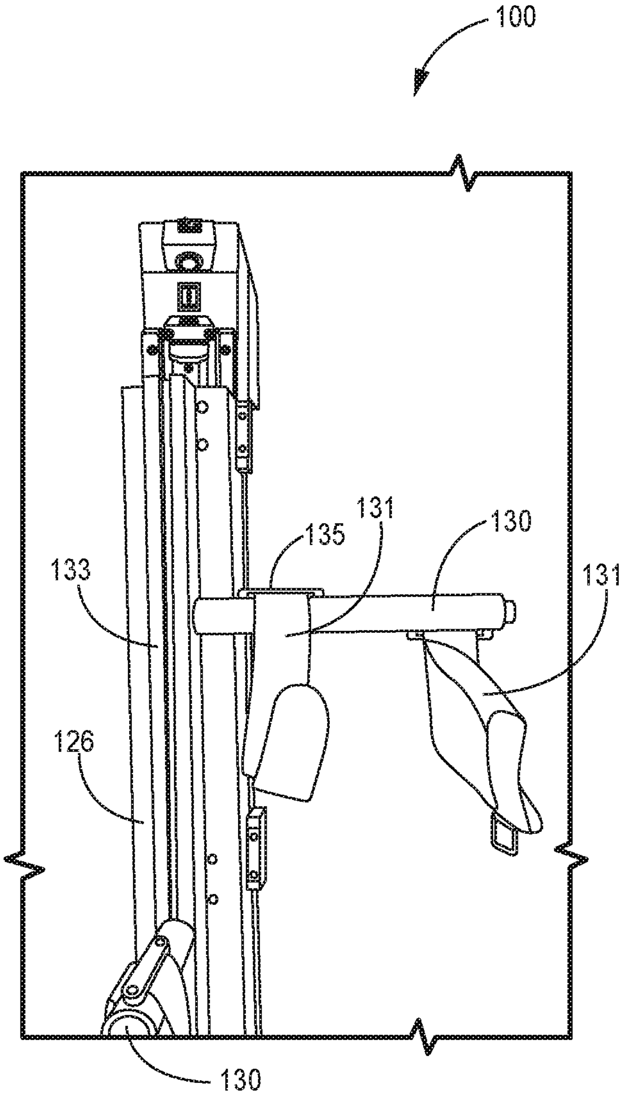
FIG. 24A is a side view of a vertical support, according to one implementation.
Figure 24B:
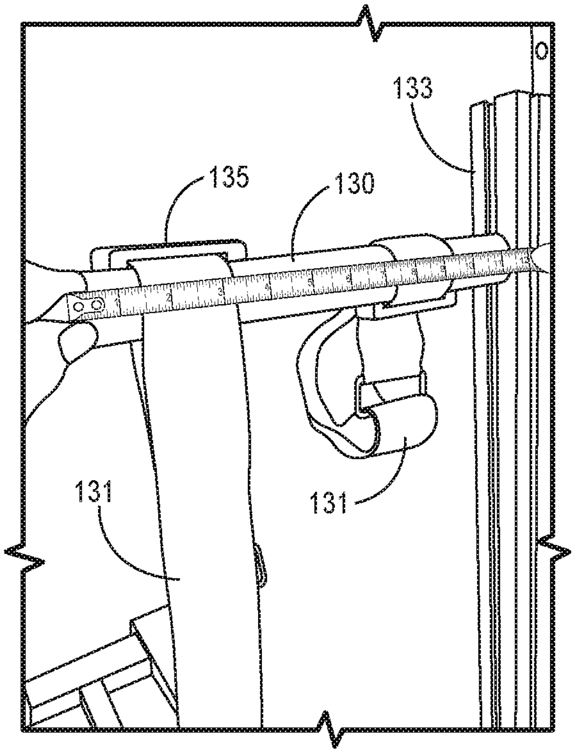
FIG. 24B is a close-up, side view of a vertical support, according to one implementation.
Figure 24C:
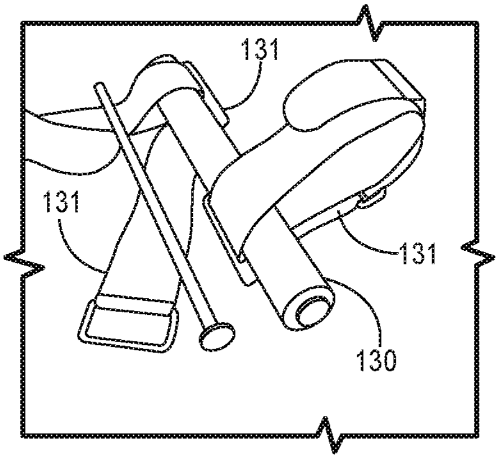
FIG. 24C is a perspective view of a detached vertical support, according to one implementation.
Figure 24D:
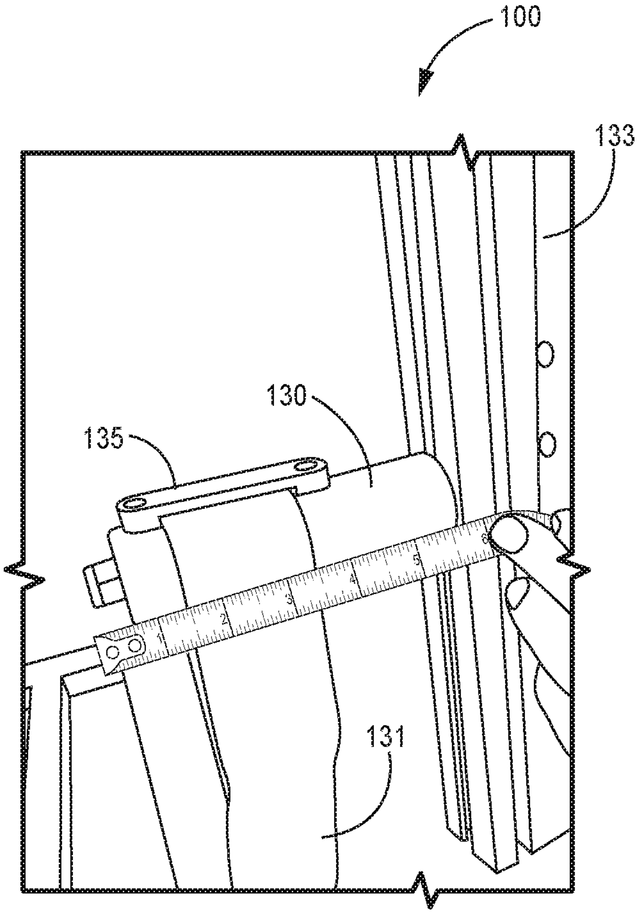
FIG. 24D is a side view of a vertical support, according to one implementation.
Figure 25:
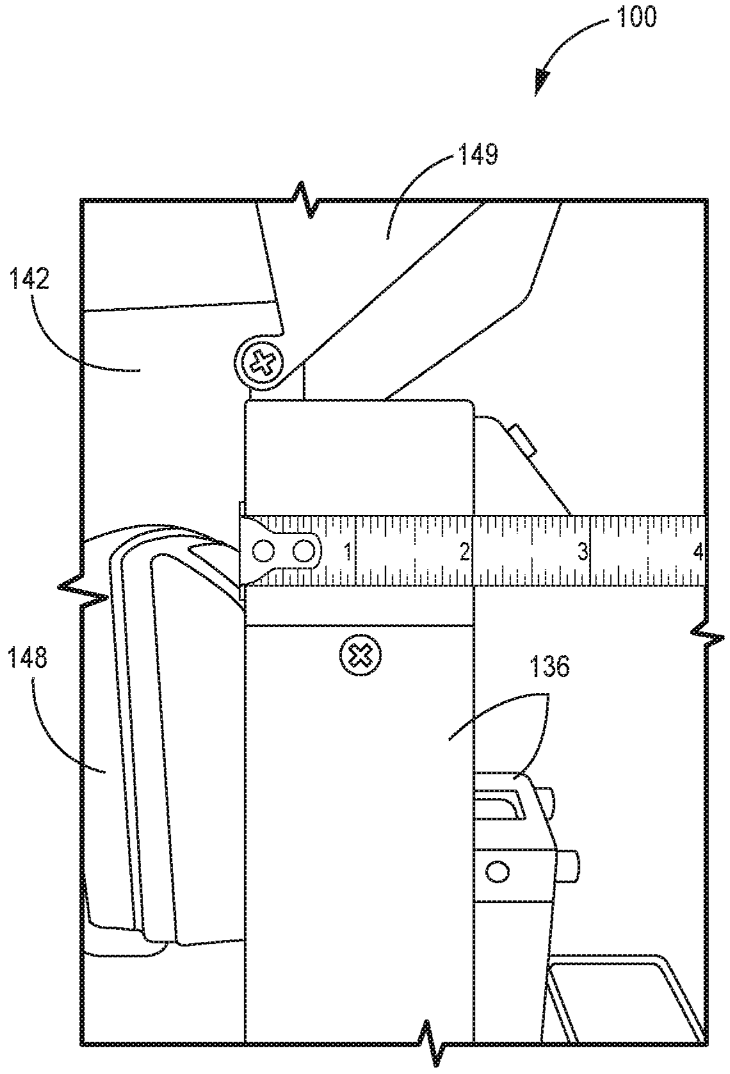
FIG. 25 is a side view of a control hub, according to one implementation.
Figure 26:
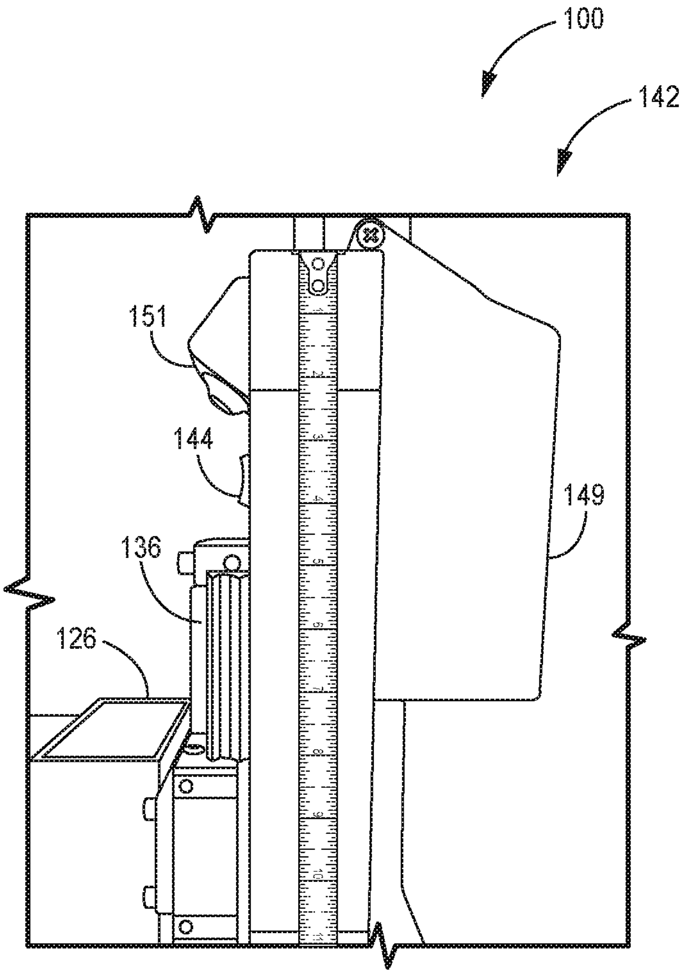
FIG. 26 is a side view of a control hub, according to one implementation.
Figure 27:
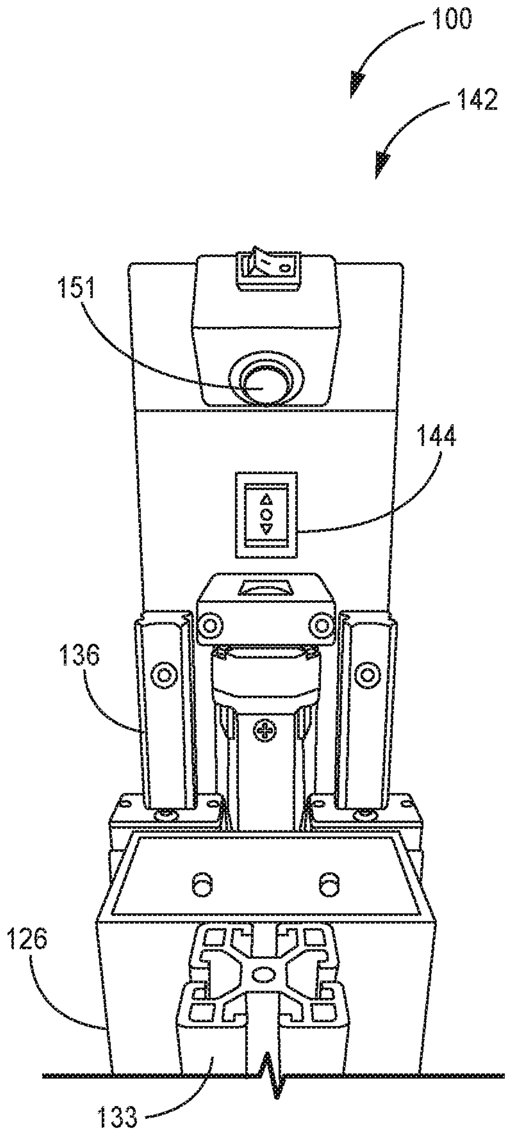
FIG. 27 is a front view of a control hub, according to one implementation.
Figure 28:
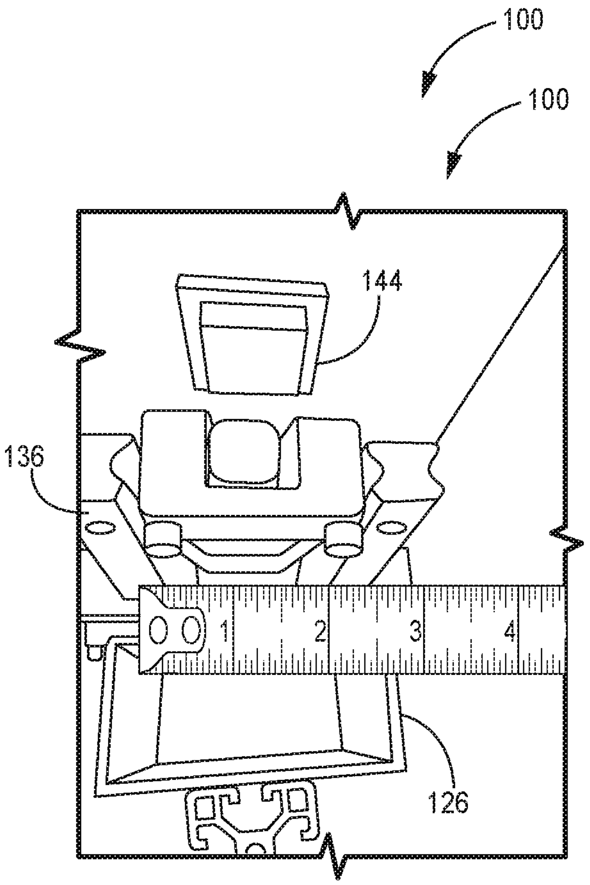
FIG. 28 is a top view of a control hub, according to one implementation.
Figure 29:
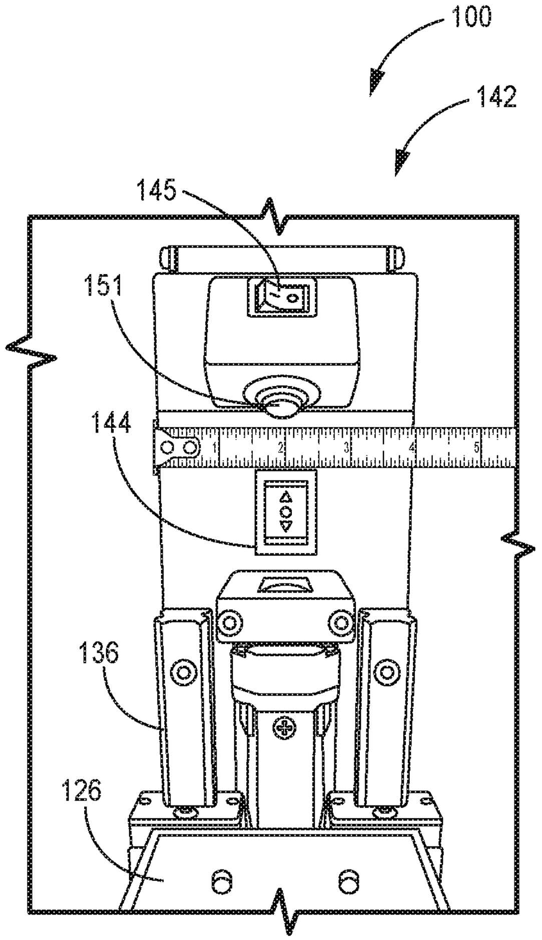
FIG. 29 is a front view of a control hub, according to one implementation.
Figure 30:
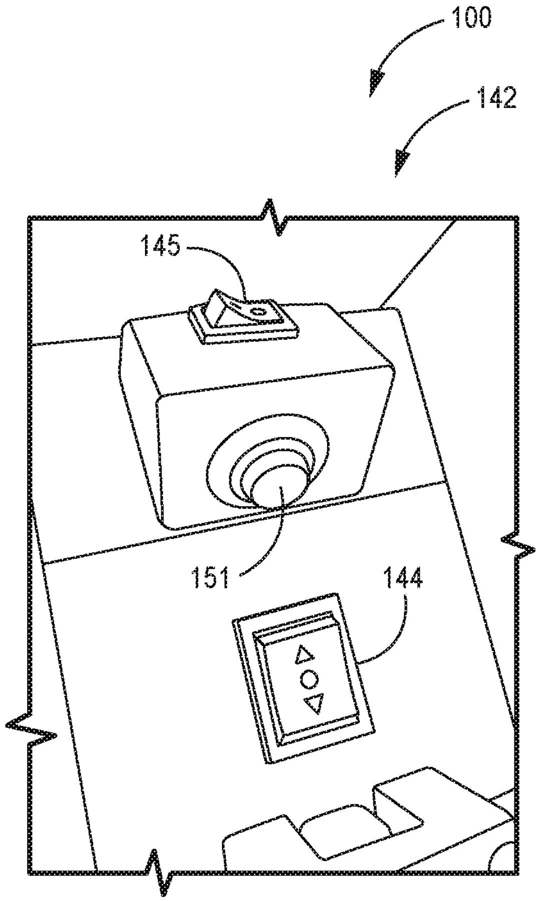
FIG. 30 is a bottom perspective view of a control hub, according to one implementation.
Figure 31:
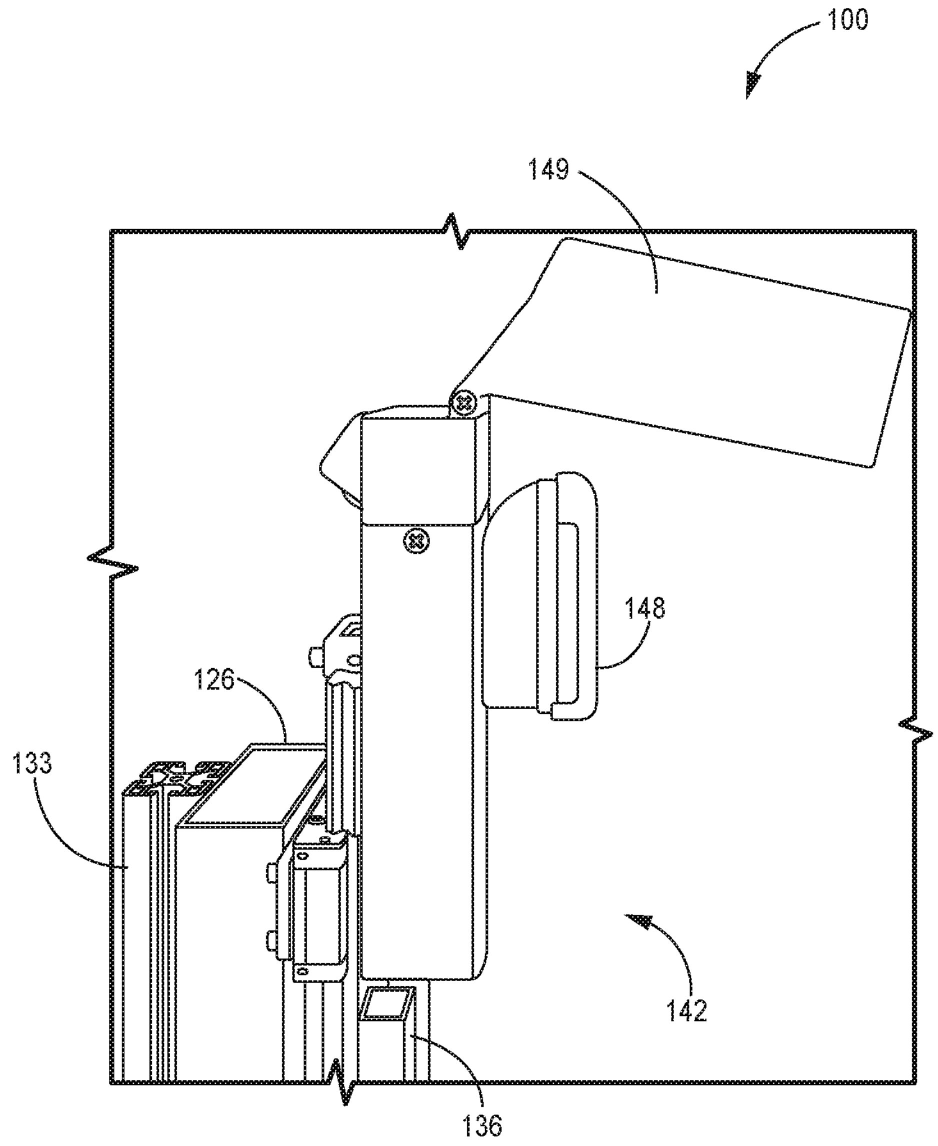
FIG. 31 is a side view of a control hub with cover lifted, according to one implementation.
Figure 32:
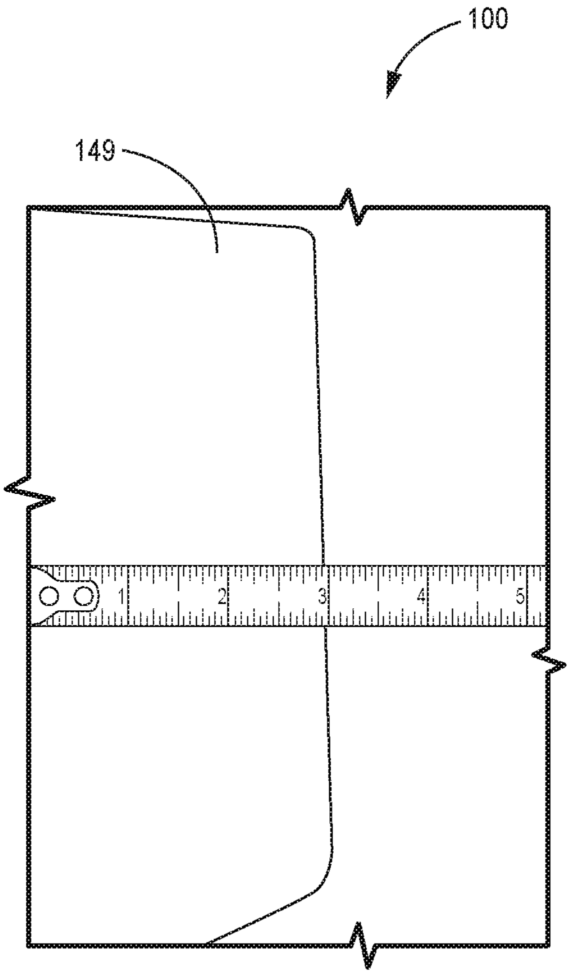
FIG. 32 is a side view of a control hub cover, according to one implementation.
Figure 33:
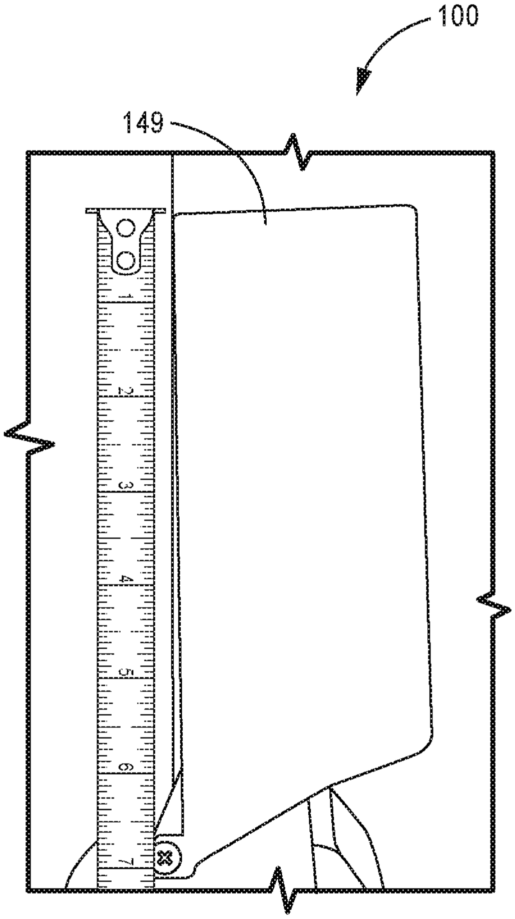
FIG. 33 is a side view of a control hub cover in a lifted position, according to one implementation.

FIG. 23 shows a rear view of the rack 100. In these and other implementations, the center beams 136 includes two portions 137A, 137B each a piece of tubing. In these implementations, the center beam is 4 inches wide overall with a 2-inch space between the two portions 137A, 137B. In certain implementations, the actuator is disposed substantially between the two portions 137A, 137B. In various implementations, the post 126 is attached/affixed to the actuator via any appreciated mechanism such that actuation of the actuator causes the post 126 to move vertically, and may be substantially parallel movement with respect to the center beam 136.

FIGS. 24A-D shows various views of the vertical support 130. In these implementations, the vertical support 130 includes a carriage bolt to be inserted into a T-slot bracket 133. In these implementations, the t-slot bracket 133 is disposed along the post 126.

The vertical support 130 may optionally include one or more straps 131 attached to the vertical support 130 via a bracket 135. The straps 131 may be adjustable for attaching a bike 2 or other time to the rack 100. The straps 131 may optionally be Velcro or hook and loop straps, alternative the straps 131 could be ratchet strap or other strap type known and appreciated by those of skill in the art.

In various implementations, the vertical support 130 includes a back fastening support rod to be fitted within a tube. Optionally a rubber or other material hose is slipped over the tube. In these implementations, the carriage bolt with washers and tightening nut goes include the tube.

In one specific implementations, the T-slot bracket 133 is a 40 mm square by 1000 mm capable of accepting a ⅜-inch bolt. In certain implementations, the back fastening support rods are about 1 inch in diameter, The straps 131 may be about 24 inches long and 2 inches wide. Various other sizes and dimensions would be understood.

In certain implementations, the rack 100 may include more than one vertical support 130. The vertical supports 130 may be of various lengths. The lengths may vary between about 6 inches to 12 inches or longer.

FIGS. 25-33 show various views of the control hub 142 of the rack 100. In various implementations, the control hub 142 may include a battery 148 and battery cover 149. The hub 142 may also include a light 151, optionally an LED light 151 configured to illuminate the rack 100 and/or the switches 144, 145. The switches 144, 145 may include an actuator switch 144 and a power switch 145. The hub 142 may also include a breaker configured to prevent overloading the various movable components of the rack 100. Further features may include an alarm/beeper configured to alert a user of the position of the rack 100 and brackets 112A, 112B. Another optional feature is a volume control for the optional alarm/beeper.

In various implementations, the electrical components with a need to be accessed, including the breaker, battery 148, volume control, and deeper, are disposed under the cover 149. In these and other implementations, the cover 149 hinges to open and close the battery area. In some implementations, the cover 149 may include a magnet to prevent the cover 149 from unintentionally opening.

Figure 34:
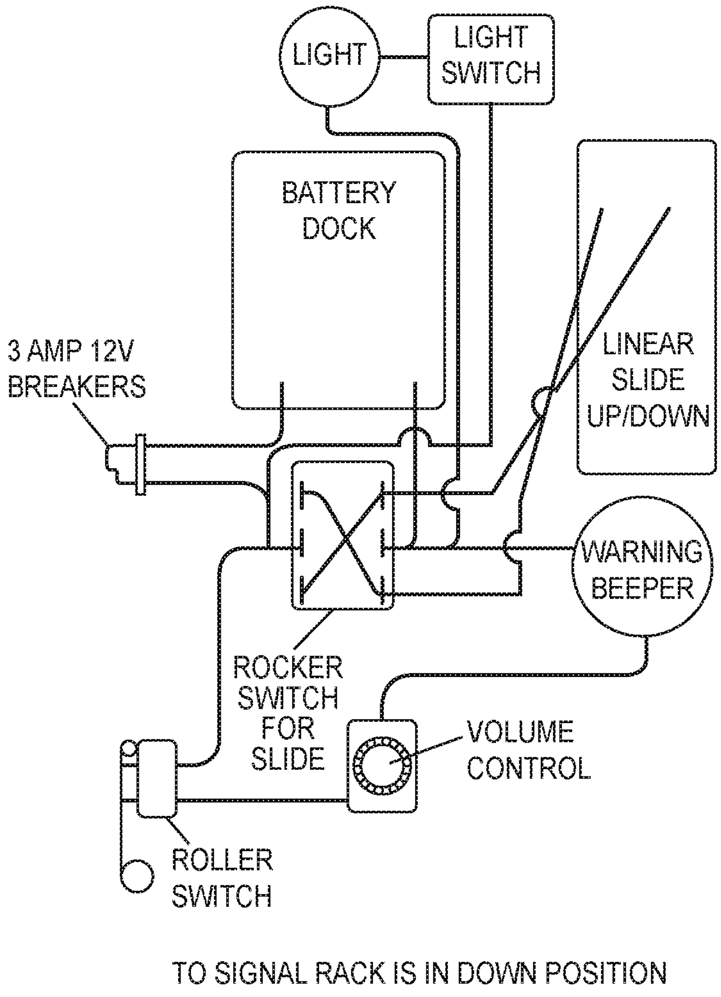
FIG. 34 is a schematic diagram of control hub and rack wiring, according to one implementation.

A schematic diagram of the wiring for the hub 142 and rack 100 is shown in FIG. 34.

Figure 35:
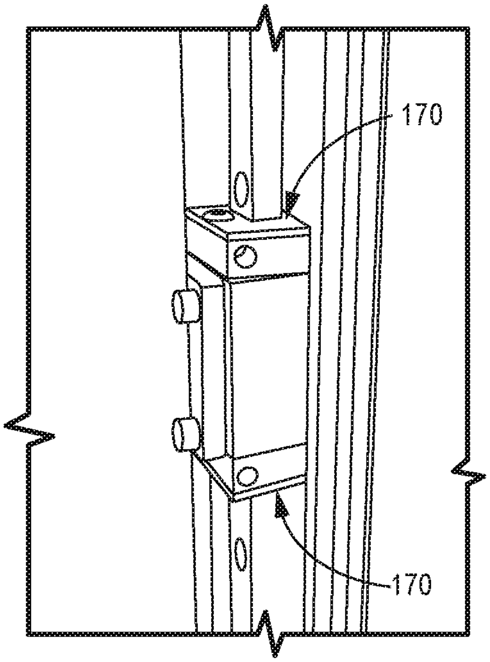
FIG. 35 is a perspective view of a self-cleaning slide, according to one implementation.

Optional self-cleaning slides 170 are shown in FIG. 35. The sliders 170 may be disposed on linear rails (also referred to a portions 137A, 137B herein) of the center beam 136 by socket head cap screws. The self-cleaning slides 170 engage with and remove debris from the slides/linear rails to allow for smooth movement of the rack 100 between raised and lowered positions.

In certain further implementations, the rack 100 includes a 2-inch receiver mounted to the post 26, 126 or support base 24 in place of a bracket 12A, 12B, 112A, 112B or other support structure disclosed herein. The 2-inch receiver or other mounting structure can be used for attaching any known bike rack, ski rack, or other cargo or sport equipment carrier to the disclosed rack system 100 and is thereby capable of vertical movement into raised and lowered positions as discussed herein.

Although the disclosure has been described with references to various embodiments, persons skilled in the art will recognized that changes may be made in form and detail without departing from the spirit and scope of this disclosure.

What is claimed is:

1. A raisable bike rack, comprising:

(a) a first support bracket and a second support bracket, both configured to be attached to a vehicle;

(b) a linear slide engaged with the support brackets, wherein the linear slide is self-cleaning and is configured to raise and lower the support brackets relative to the vehicle for bike loading;

(c) a control hub configured to control the linear slide;

(d) a dock in communication with the control hub, the dock configured to receive a removable power source, the dock comprising a cover pivotably attached to the dock, the cover constructed to protect the removable power source when the removeable power source is received by the dock and to pivot away from the dock to allow disengagement of the removable power source;

(e) one or more straps disposed through one or more slots in the support brackets; and (f) an alarm configured to sound when the linear slide is in a lowered position, wherein the first support bracket and second support bracket are configured to fold vertically into a compact position when not attached to a vehicle, wherein the removable power source is configured to enable the actuation of the linear slide, and wherein the one or more straps are configured to secure a variety of bike wheel geometries.

2. The raisable bike rack of claim 1, wherein the control hub further comprises an actuator switch in communication with the removable power source.

3. The raisable bike rack of claim 2, wherein the power source comprises a battery.

4. The raisable bike rack of claim 1, further comprising a center beam.

5. The raisable bike rack of claim 4, wherein the center beam is attached to the support brackets and the linear slide on a first portion such that the support brackets are capable of a lowered loading state and a raised transport state.

6. The raisable bike rack of claim 5, wherein the center beam is attached to a vehicle connection mechanism on a second portion such that the first portion of the center beam is configured to move relative to the second portion of the center beam.

7. A raisable bike rack, comprising:

(a) a first support bracket and a second support bracket, both configured to support a bike;

(b) a vehicle connection mechanism;

(c) a linear slide that is self-cleaning and engaged with the support brackets and the vehicle connection mechanism;

(d) a control hub configured to control the linear slide;

(e) a dock in communication with the control hub, the dock configured to receive a removable power source, the dock comprising a cover pivotably attached to the dock, the cover constructed to protect the removable power source when the removeable power source is received by the dock and to pivot away from the dock to allow disengagement of the removable power source;

(f) one or more straps disposed through one or more slots the support brackets; and (g) an alarm configured to sound when the linear slide is in a lowered position, wherein the first support bracket and second support brackets are configured to fold vertically into a compact position when not attached to a vehicle, wherein the linear slide is configured to raise and lower the support bracket relative to the vehicle connection mechanism for bike loading, wherein the removable power source is configured to enable the actuation of the linear slide, and wherein the one or more straps are configured to secure a variety of bike wheel geometries.

8. The raisable bike rack of claim 7, further comprising a center beam, wherein the center beam is attached to the support brackets and the linear slide on a first portion such that the support brackets are is capable of a lowered loading state and a raised transport state.

9. The raisable bike rack of claim 8, wherein the support brackets are is in contact with a ground surface when in the lowered loading state.

10. The raisable bike rack of claim 7, wherein the support brackets further comprise a support base, a wheel support, a support arm, and a side arm.

11. The raisable bike rack of claim 10, wherein the support base is removably attached to a side arm and a post.

12. The raisable bike rack of claim 11, further comprising a vertical support coupled to the post, wherein the vertical support is configured to be raised and lowered with the support brackets relative to the vehicle connection mechanism for the bike loading.

13. The raisable bike rack of claim 7, wherein the vehicle connection mechanism further comprises a hitch beam configured to engage a receiving hitch.

14. A raisable bike rack, comprising:

(a) a support bracket configured to support an electric bike;

(b) a vehicle connection mechanism;

(c) a linear slide engaged with the support bracket and the vehicle connection mechanism, wherein the linear slide is self-cleaning and is configured to raise and lower the support bracket relative to the vehicle connection mechanism for bike loading;

(d) a control hub disposed on the linear slide, wherein the control hub is configured to control the linear slide;

(e) a dock in communication with the control hub, the dock configured to receive a removable power source, the dock comprising a cover pivotably attached to the dock, the cover constructed to protect the removable power source when the removeable power source is received by the dock and to pivot away from the dock to allow disengagement of the removable power source;

(f) one or more straps disposed through one or more slots in the support bracket; and (g) an alarm configured to sound when the linear slide is in a lowered position, wherein the first support bracket and second support bracket are configured to fold vertically into a compact position when not attached to a vehicle, wherein the removable power source is configured to enable the actuation of the linear slide, and wherein the one or more straps are configured to secure a variety of bike wheel geometries.

15. The raisable bike rack of claim 14, wherein the control hub further comprises an actuator switch in communication with the removable power source.

16. The raisable bike rack of claim 15, wherein the actuator switch comprises an up position, a down position, and an off position.

17. The raisable bike rack of claim 15, wherein the linear slide is configured to compress and move the support bracket up to a transport state when the actuator switch is in the up position.

18. The raisable bike rack of claim 15, wherein the linear slide is configured to extend and move the support bracket down to a loading state when the actuator switch is in the down position.

19. The raisable bike rack of claim 15, wherein the linear slide is configured to lock the support bracket in place when the actuator switch is in the off position.

* * * * *